Aug. 13, 1940.   H. T. AVERY   2,211,225
CALCULATING MACHINE
Original Filed Dec. 7, 1931    9 Sheets-Sheet 1
FIG_1_
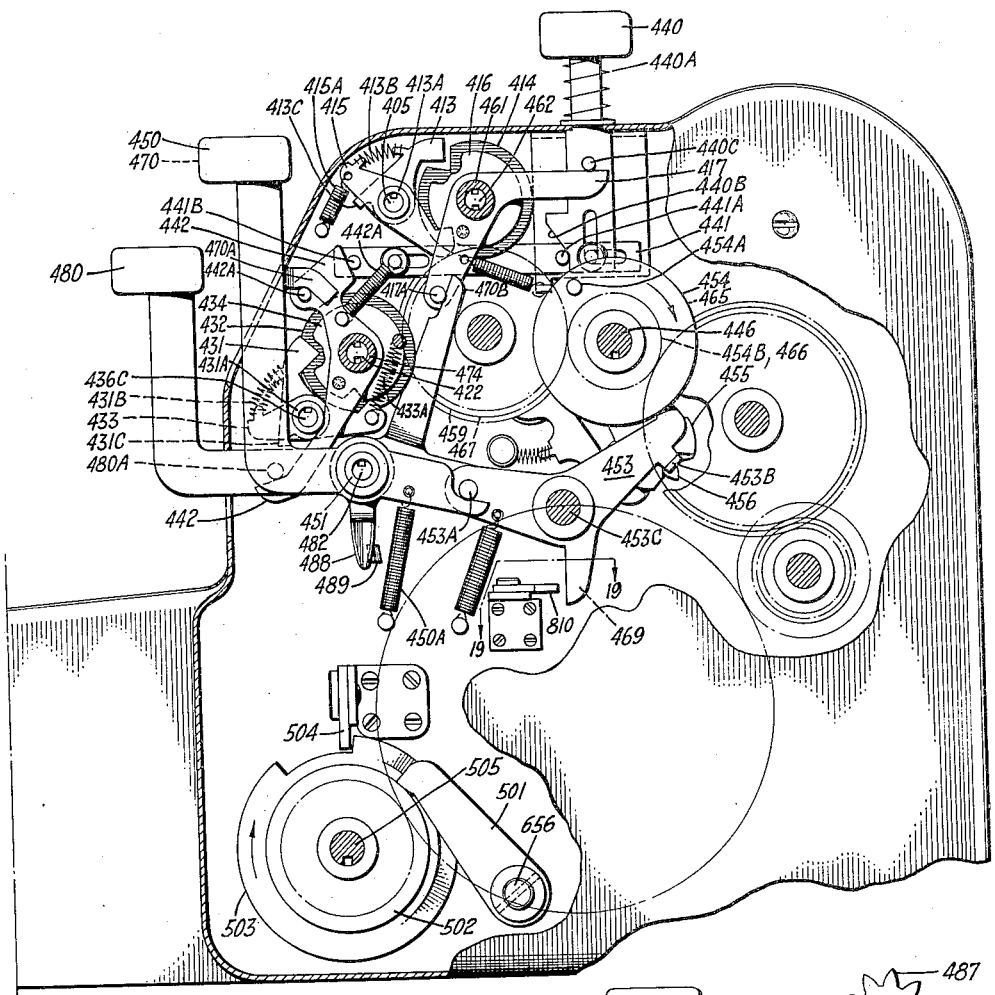
FIG_2_
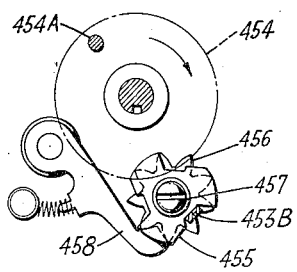
FIG_3_
INVENTOR.
Harold T. Avery
BY
ATTORNEY.

Aug. 13, 1940. H. T. AVERY 2,211,225
CALCULATING MACHINE
Original Filed Dec. 7, 1931 9 Sheets-Sheet 2
FIG_4_
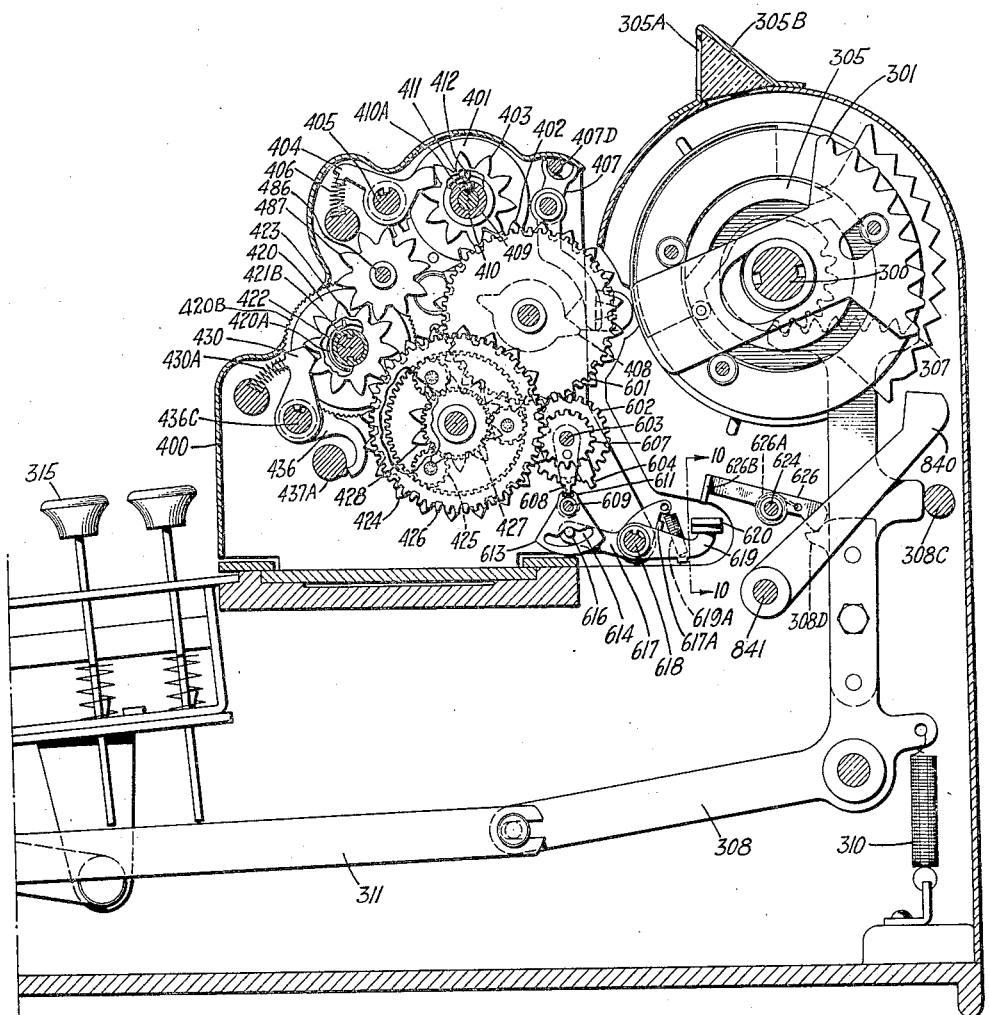
FIG_5_
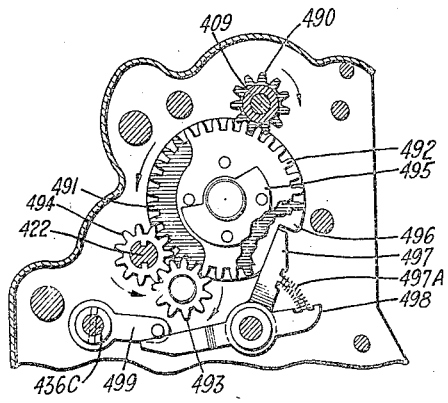
FIG_6_
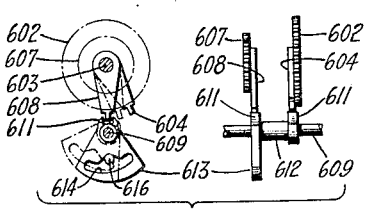
INVENTOR.
Harold T. Avery
BY
ATTORNEY

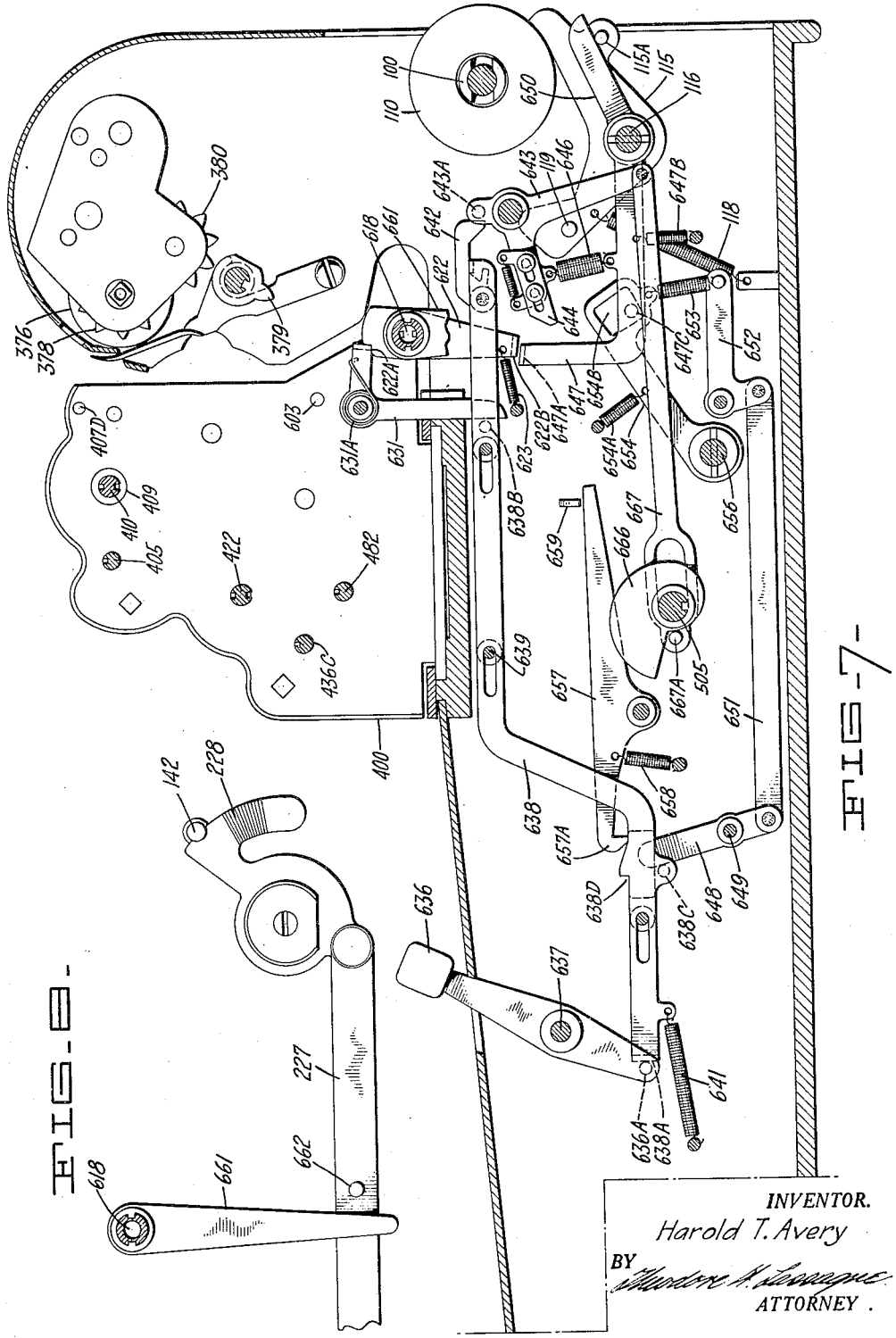

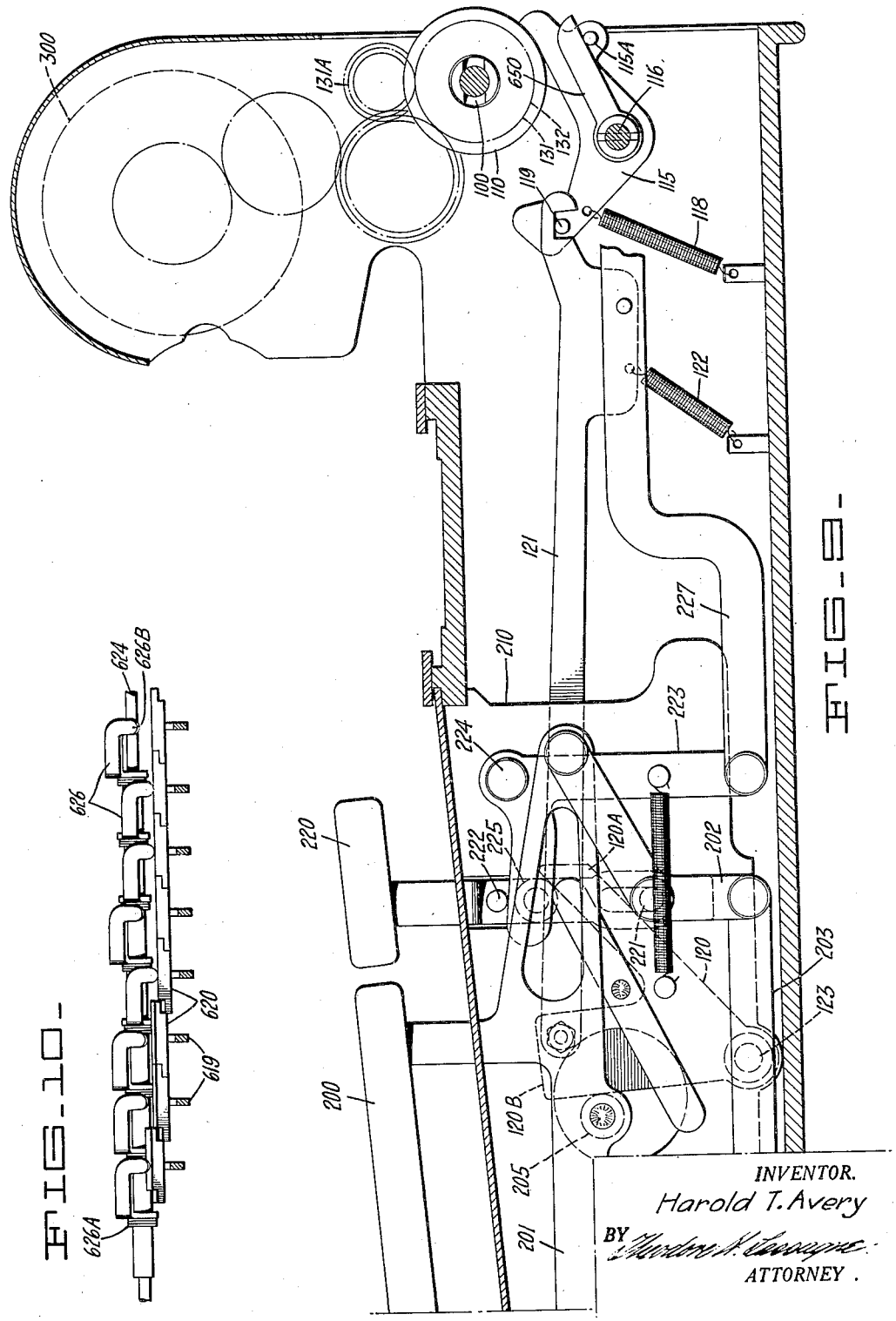

Aug. 13, 1940.  H. T. AVERY  2,211,225
CALCULATING MACHINE
Original Filed Dec. 7, 1931   9 Sheets-Sheet 5
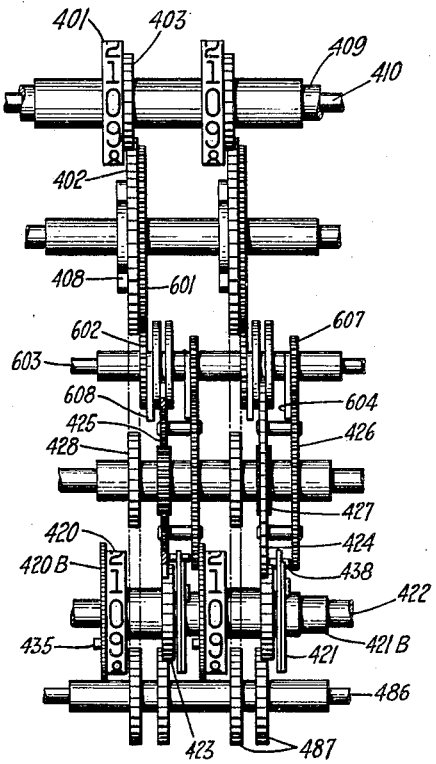
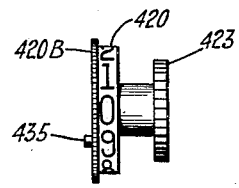
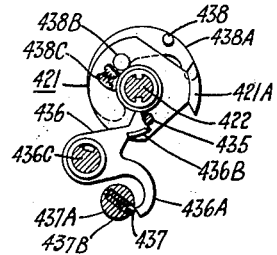
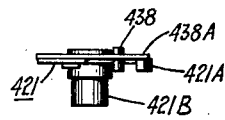
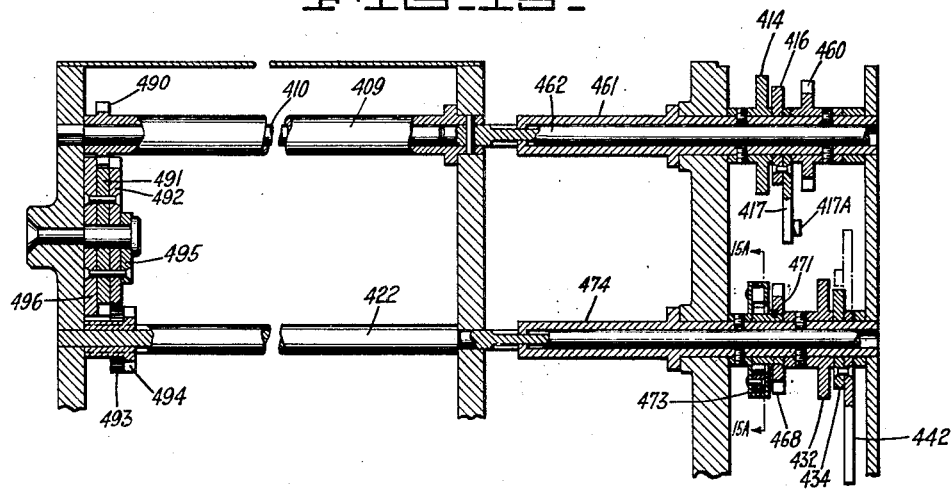
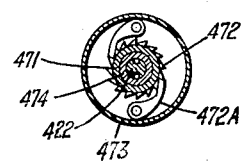
INVENTOR.
Harold T. Avery
BY
ATTORNEY.

Aug. 13, 1940.                H. T. AVERY                    2,211,225
                         CALCULATING MACHINE
                  Original Filed Dec. 7, 1931    9 Sheets-Sheet 6

INVENTOR.
Harold T. Avery
BY
ATTORNEY.

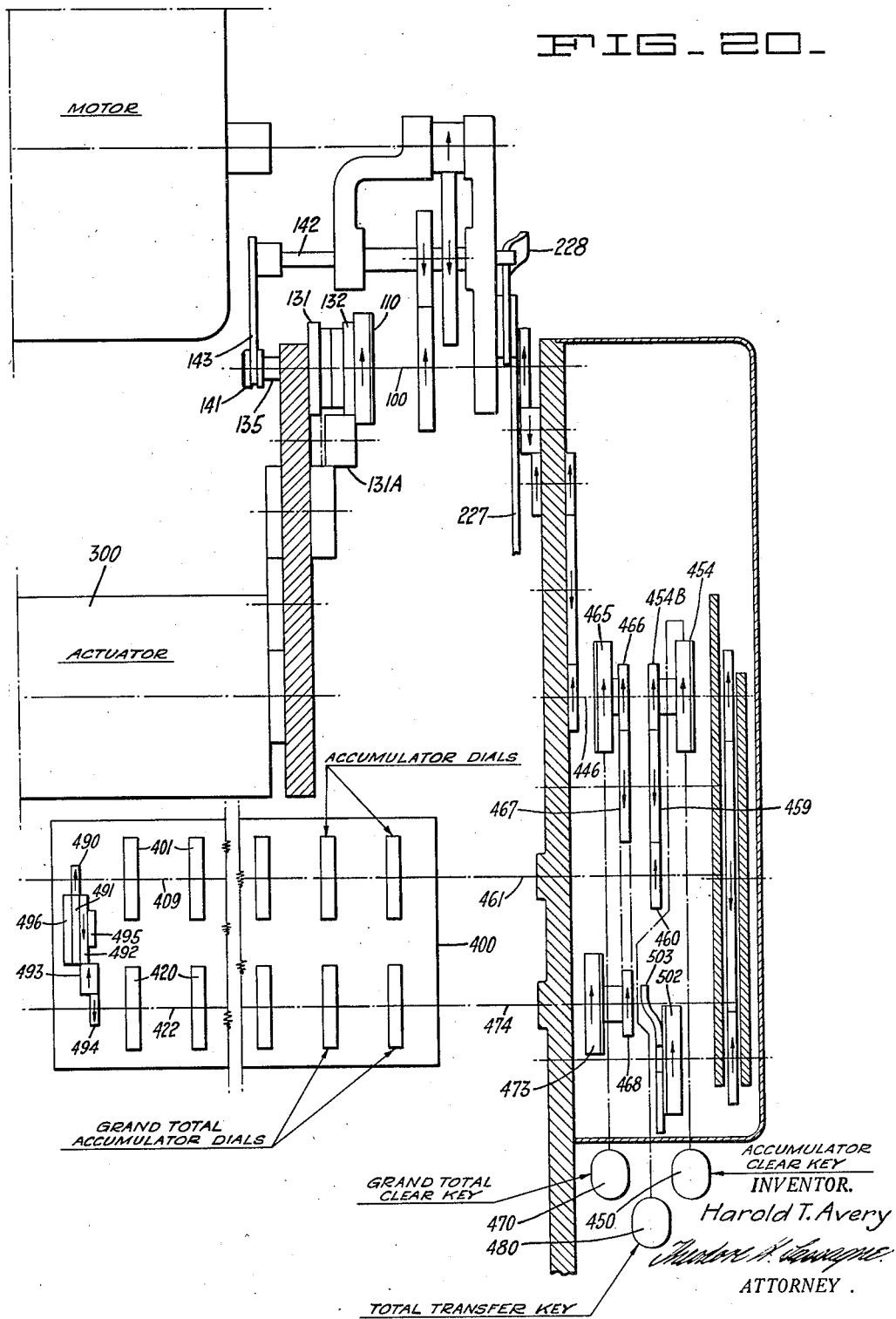

Aug. 13, 1940.   H. T. AVERY   2,211,225
CALCULATING MACHINE
Original Filed Dec. 7, 1931   9 Sheets-Sheet 8
FIG_21_
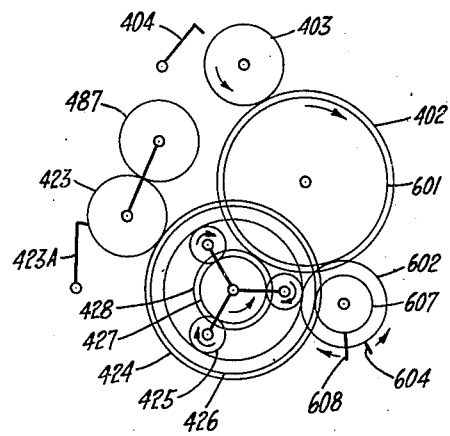
FIG_22_
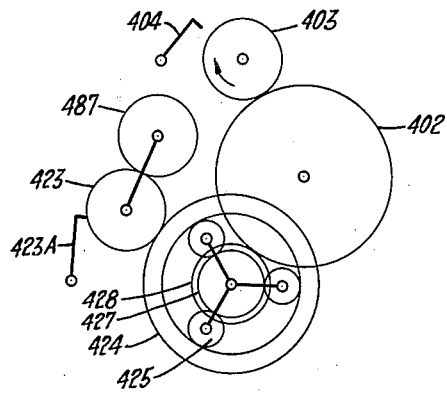
FIG_23_
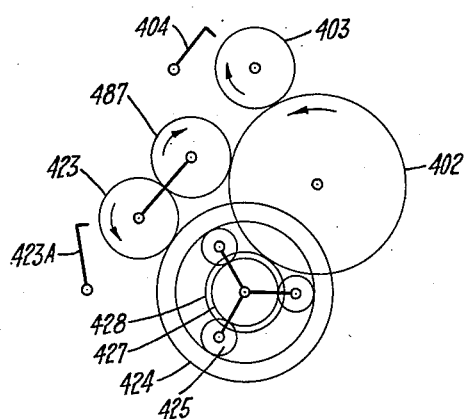
FIG_24_
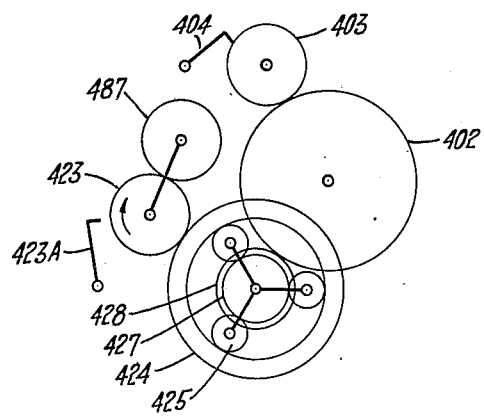
INVENTOR.
Harold T. Avery
BY
ATTORNEY.

Aug. 13, 1940.          H. T. AVERY                2,211,225
                    CALCULATING MACHINE
             Original Filed Dec. 7, 1931    9 Sheets-Sheet 9

INVENTOR.
Harold T. Avery
BY
ATTORNEY.

Patented Aug. 13, 1940

2,211,225

UNITED STATES PATENT OFFICE 2,211,225

CALCULATING MACHINE

Harold T. Avery, Oakland, Calif., assignor to Marchant Calculating Machine Company, a corporation of California Application December 7, 1931, Serial No. 579,401
Renewed January 8, 1936

25 Claims. (Cl. 235—63)

The present invention relates to calculating machines of the type adapted to perform the four primary calculations, but particularly to the type embodying a grand total register as well as an accumulator register and automatic division mechanism.

It is an object of the invention to provide a calculating machine embodying automatic division mechanism which builds a dividend figure to obtain a quotient figure.

Another object of the invention is the provision of automatic division mechanism wherein the dividend is set up on one registering mechanism and utilized to control mechanism to register the dividend upon a second registering mechanism and thereby obtain a quotient figure.

Another object of the invention is the provision of automatic division mechanism including controlling mechanism adapted to continuously form an indication of the proper succeeding operations.

Another object of the invention is the provision of automatic division mechanism including means for continuously comparing two values entered into the machine to control machine operation in performing division.

Another object of the invention is the provision of automatic division controlling mechanism including differential mechanism adapted to compare the values standing in one register with the values standing in another register to control machine operation.

Another object of the invention is the provision of means for transferring values from one register to a second register.

Another object of the invention is to provide a double register carriage in which one of said registers is adapted to control the entry of items in the second register, either from the first register or from the actuating mechanism.

Other objects will appear as this specification progresses.

The invention possesses a plurality of advantageous features, some of which will be set forth at length in the following description where that form of the invention which has been selected for illustration in the drawings accompanying and forming a part of the present specification will be described in full.

In said drawings one form and one adaptation of the apparatus has been shown, but it is to be understood that the invention has not been limited to such, since the invention, as set forth in the claims, may be embodied in a plurality of other forms and adaptations.

It is manifest that the invention may be embodied in a calculating machine having any type of mechanism for actuating the numeral wheels. However, in the accompanying drawings it is shown embodied in a calculating machine of the general type disclosed in the patent to Friden No. 1,643,710 dated September 27, 1927, to which reference is hereby made for disclosure of mechanisms of a calculating machine not specifically described herein.

In the accompanying drawings forming a part of the specification:

Figure 1 is a partial right side view of the calculating machine with part of the casing broken away to disclose the mechanism controlled by the clear and total transfer keys.

Figure 2 is a detail view of the mechanism for ensuring a plurality of rotations of the clear clutches.

Figure 3 is a detail view of a portion of the total transfer controlling mechanism.

Figure 4 is a longitudinal section through the calculating machine as viewed from the right showing the automatic division control mechanism, the two registers, and the actuating mechanism.

Figure 5 is a right side view of certain drive controlling mechanism in total transfer operations.

Figures 6 shows detail views of certain controlling mechanism in automatic division operations.

Figure 7 is a longitudinal section through the calculating machine looking from the right and showing the automatic division lever and associated operation controlling mechanism.

Figure 8 is a detail view of the reversing control for the actuating mechanism.

Figure 9 is a partial longitudinal section through the calculating machine looking from the right and showing the plus and minus keys and the control exerted thereby over the driving mechanism.

Figure 10 is a detail view of certain automatic division control mechanism.

Figure 11 is a developed front view of the sub-total and grand total registers, showing the differential gearing connecting the same.

Figure 12 is a detail view of a grand totalizer dial.

Fig. 13 is a detail view of the grand total transfer mechanism.

Figure 14 is a detail plan view of the mechanism shown in Figure 13.

Figure 15 is a transverse section showing the driving mechanism for the subtotal or accumulator and grand total register shafts.

Figure 15A is a detail view taken on the line 15A—15A in Figure 15.

Figure 20 is a diagrammatic plan view disclosing the driving mechanism for the main actuator, the shifting mechanism, the clearance mechanism, and the total transfer mechanism.

Figure 21 is a diagrammatic view of the grand total and subtotal registers and the differential gearing connecting the same illustrating the direction of rotation during positive actuation.

Figure 22 is a diagrammatic view similar to Figure 21 illustrating the condition of the parts and the direction of rotation when the subtotal or accumulator register clear key is depressed.

Figure 23 is a diagrammatic view similar to Figure 21 illustrating the condition of the parts and the direction of rotation when the total transfer key is depressed.

Figure 24 is a diagrammatic view similar to Figure 21, illustrating the condition of the parts and the direction of rotation when the grand total register clear key is depressed.

Figure 16:
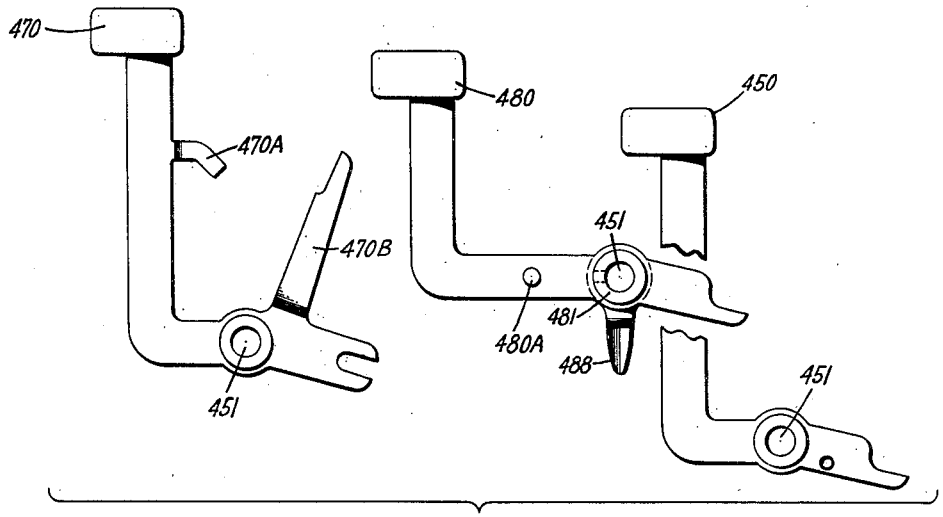
Figure 16 shows detail views of the total and subtotal clear keys and the total transfer key.

Calculating machines heretofore have been provided with automatic division mechanism which, when the dividend is set in the registering mechanism, operate to repeatedly subtract therefrom the divisor in each ordinal division thereby determining the quotient figure. Calculating machines are also known in which the process of division is performed by alternate subtraction and addition in successive orders to obtain the quotient figure. Both of the above noted processes of performing the operation of division require overdraft mechanism; that is, the successive operations are determined upon successive overdraft, negative and positive, in the accumulator, thereby requiring additional operations in the various ordinal positions and a greater amount of time to perform the operation. Calculating machines are also known wherein are provided subtotal and grand total registers, means being provided for transferring the values from the subtotal register to the grand total register for controlling the entry of values therein by the actuator.

The present invention provides a mechanism whereby the process of division is performed by additive and subtractive registration in which the dividend is set upon one register, and controlling mechanism determines the entry of a like number in the second register, and upon such number being obtained the quotient stands in the counter register. Thus the dividend being set in one register, the same value is built up in a second register, until the second register has entered therein a value substantially corresponding to the dividend. The registration in some decimal orders may be positive and that in other orders negative. Occasionally both positive and negative strokes may be made in the same order, as hereinafter described, but on the average the machine herein disclosed performs division in fewer cycles than do machines equipped with the other types of automatic division control mentioned.

This process of division offers several advantages over prior processes which have been used. One of these is that, in addition to displaying the quotient all three factors entering into the division computation, i. e., the dividend, divisor, and built-up dividend are in the machine ready for checking upon the completion of the calculation. If a series of computations involves the use of a common dividend, as for instance in the preparation of interest tables and the like, the dividend can be set in the totalizer dials at the beginning of the series of computations, and all that is necessary thereafter is to set up each successive divisor and perform the operation of division, clearing the subtotal dials after the completion of each calculation. The dividend need be put in the machine only once for the series of computations, and if the successive divisors differ only in the last figure, as is frequently the case with this type of computation, the divisor can be left on the keyboard, only changing between computations the figure or figures which vary.

A type of computation which even more frequently occurs is that involving a common divisor and a group of different dividends. Every prorating and distribution problem involves this type of computation. In the machine disclosed in this application, the divisor can be left constantly on the keyboard and the totalizer dials changed to the new dividend, by means of their setting disks after the completion of each computation. It is necessary during this setting operation, however, to move each dial directly from its old to its new digit registration without passing through the 9–0 position of the dial. As hereinafter explained, means are provided to positively prevent the dial being turned past its 9–0 position in one direction of rotation and to yieldably resist such movement in the other direction of rotation. It will not even be necessary to clear the subtotal dials when setting in a new dividend, as the direction control already described will serve to start the machine building either backward or forward from the last value registered in the sub-total dial, depending upon whether the new dividend is larger or smaller than the value occurring in the subtotal dial.

Aside from the great saving in time that can thus be effected wherever a common dividend or a common divisor is involved, a very substantial saving is made throughout the ordinary division operation, due to the fact that the result is obtained by a combination of forward and backward actuations, which on the average are considerably fewer than those required in the present method of overdraft and correction utilized in automatic division. A still further saving in time is made by the fact that wherever zeroes occur in the quotient, the carriage is shifted through that ordinal position without the necessity for any trial subtraction and the subsequent corrective addition in the zero column. Thus, if the carriage is shifted to its right hand position is starting a division operation, it automatically shifts directly to the proper column for commencing the operation before the calculating mechanism is started. The above noted application of the present machine illustrates in part the advantages derived from the structure disclosed herein in performing division by a built-up process. Obviously, however, the machine can be used for certain other types of computations as well.

ACTUATOR AND DIFFERENTIAL MECHANISM

As fully disclosed in said Friden patent, values are entered into the machine by depression of the numeral keys 315 (Figure 4). Said keys act to position a selecting bar 311 which at its rearward end is pivoted to a bellcrank 308, said bellcrank being provided at its upper end with a rack 307 meshing with a gear secured to the selecting element 305, which is thereby differentially positioned upon depression of a numeral key. The selecting bellcrank 308 is normally held in its rearward position by a spring 310 which serves to rock said lever against a stop pin 308C.

Suitable means are provided for locking the element 305 in adjusted position upon rotation of the actuator comprising means adapted to rock shaft 841 upon such rotation, thereby moving locking dog 840 into engagement with an arcuate rack formed on the selecting element 305. The value to which the selecting element 305 is adjusted may be seen through sight opening 305A, as reflected in a suitable mirror 305B from numerals delineated on a flange of said selecting element. Said element is loosely mounted on shaft 300 and serves to control the engagement of an actuating element 301 with an intermediate gear in accordance with the value of the depressed key. The manner in which said control is exerted and the mechanism required therefor is fully disclosed in the above mentioned patent to Friden to which reference is hereby made for a more complete disclosure of the same.

DRIVING MECHANISM

In the present embodiment, the driving mechanism comprises an electric motor which is connected to the drive shaft 100 (Figures 7, 9, and 20) by appropriate reducing gearing, and is adapted to be intermittently connected to the calculating mechanism to drive the same. The means whereby the drive is connected to the calculating mechanism includes a clutch 110 (Figures 7, 9, and 20) which is fully disclosed in said patent to Friden, and which is controlled by a bellcrank member 115 journaled on the stub shaft 116 and carrying at one end a foot adapted to enter an aperture in the clutch housing when said clutch housing is in full cycle position to disengage the clutch. A spring 118 (Figures 7 and 9) tensioned between a stud on the machine base and the opposite arm of bellcrank 115 tends to urge the foot into disengaging position so that in the absence of intervention by other instrumentalities the actuator will be brought to rest with the clutch in disengaged position when it reaches full cycle position after a rotation.

Means are provided for operating the bellcrank 115 to engage the clutch and drive the actuator for the number of rotations requisite to perform a desired calculation, and a pin 119 is provided on the forward end of the bellcrank for this purpose. Pin 119 is engaged by the notched rear end of the control link 121 (Figure 9) which is pivoted at its forward end to control plate 120, and is normally held in position overlying the pin 119 by a spring 122 tensioned between a suitable stud on the base plate and an intermediate point on the control link. Control plate 120 is fixed to shaft 123 journaled in the machine, and comprises a forward vertical portion 120B adapted to cooperate with the plus key 200 and a rearward inclined portion 120A adapted to cooperate with the minus key 220. Operation of either of these keys serves to impart a clockwise oscillation to control plate 120. This imparts a corresponding clockwise oscillation to the clutch operating bellcrank 115, rocking the same out of contact with the clutch housing and permitting engagement of the clutch for the period that such adjustment is maintained.

The plus key 200 (Figure 9) is mounted on a frame 201 which is supported on a pair of angular parallel links 202, one of which is shown in Figure 9, which are connected at their opposite ends by a link 203. The frame 201 carries a roller 205 which abuts the forward vertical end 120B of the control plate 120, and is adapted, upon depression of the key 200, to oscillate said control plate in a clockwise direction against the tension of suitable spring means serving to hold said plus key in elevated position.

The minus key 220 is slidably mounted on the intermediate plate 210 by pin and slot connection 221. The stem of the key 220 carries a pin 222 which overlies the upper arm of a bellcrank 223 pivoted at 224, the lower end of which is connected to a link 227 which serves to control the reversing gearing to be described hereinafter. Also secured to the stem of the key 220 is a roller 225 which abuts the rearward inclined arm 120A of control plate 120. From the foregoing it is evident that upon depression of the minus key 220, bellcrank 223 is oscillated to cause a shifting of the reversing gearing, and control plate 120 is oscillated to cause engagement of the clutch.

The reversing gearing comprises a pair of gears 131—132 (Figures 9 and 20) which constantly rotate in opposite directions. Either of these gears is adapted to be driven from the supporting shaft depending upon the position of a pin which is adapted to be shifted into the respective seat of either of said gears, as fully disclosed in the patent to Friden, No. 1,682,901 dated September 4, 1928, to which reference is hereby made for a full disclosure of such mechanism. The gear 132 includes an idler gear 131A in its drive train to the actuating mechanism, thereby serving to rotate said mechanism reversely from the direction of rotation imparted thereto from gear 131. The pin which determines the driving engagement of gears 131 and 132 is secured to shaft 135 (Figure 20) to which is secured a collar 141 which is engaged by a fork 143 secured to a shaft 142 slidably mounted in suitable supports from the base plate. The opposite end of said shaft 142 is notched to receive the cam flange of a member 228 controlled by link 227, as shown in Figures 8 and 20. Rearward movement of link 227, as shown in Figure 8, causes counter-clockwise movement of member 228 and its cam flange to shift the shaft 142, fork 143, shaft 135, and the pin carried thereby from engagement with gear 131 to engagement with gear 132 thereby setting the machine for subtractive actuation.

THE COUNTER REGISTER

The counter register comprises a series of numeral wheels 376 (Figure 7) mounted in the frame of the machine and adapted to be driven by an actuator 379 through intermediate gears 380 and counter-gear 378 in a manner described in the above-mentioned Patent No. 1,643,710. The actuator 379 is splined on its supporting shaft and is shiftable oppositely to the direction of carriage shift to register in the respective orders of the counter.

THE SUBTOTAL REGISTER

The calculating machine as previously described embodies a rotary actuator into which values are introduced upon depression of the numeral key. On rotation of the actuator the introduced values are transmitted to the numeral wheels 401 (Figures 4 and 11) by means of the gears 403 secured to said numeral wheels and driven by the twenty-tooth intermediate gears 402. The ten-tooth gears 403 are engaged by a series of escapement pawls 404 to provide step-by-step movement of the numeral wheels 401, prevent their overthrow, and place them in proper engagement position with the actuator. The pawls 404 are keyed to a shaft 405 having a keyway wider than the key on said pawls, which are pressed into engagement with the gears 403 by the compression springs 406. Shaft 405 is normally held in the position shown in Figure 4 in which pawls 404 are permitted to operate as conventional spring pressed overthrow preventing pawls.

Shaft 405 telescopes within and is keyed to a sleeve 413A journaled in the frame (Figure 1) and secured to said sleeve is a pawl 413 which is connected by compression spring 413B and lateral extension 413C with a pawl 415 loose on said sleeve. The nose of pawl 415 is maintained seated in a notch in disk 416 loosely mounted on sleeve 461 (Figures 1 and 15) by a spring 415A, thereby maintaining pawl 413 with its nose partially within the notch in disk 414 secured to sleeve 461 as shown in Figure 1. The arrangement is such that movement of disk 416 through pawl 415 and spring 413B rocks pawl 413, sleeve 413A and shaft 405 in a clockwise direction, thereby locking subtotal wheels 401 against movement. Rotation of disk 414 rocks pawl 413 against the compression of spring 413B, sleeve 413A and shaft 405 in a counter-clockwise direction thereby moving pawls 404 out of engagement with subtotal wheels 401.

Figure 17:
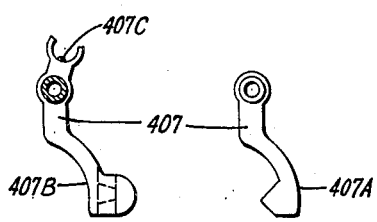
Figure 17 shows detailed views of a portion of the transfer mechanism for the subtotal register.
Figure 18:
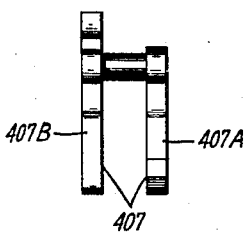
Figure 18 is a front elevation of the transfer lever assembly for the subtotal register.

The tens transfer mechanism associated with the subtotal register is of a well known type. Each numeral wheel is provided with a transfer lever 407 (Figures 4, 17, and 18) comprising two arms 407A and 407B. The arm 407A (Figures 4 and 17) is provided with a nose which is adapted to cooperate with either of two projections 408 formed on a cam integral with the twenty-tooth intermediate gear 402. Thus, upon passage of the numeral wheel 401 from zero to nine or from nine to zero, the transfer lever 407 is rocked to opposite position, where it is resiliently held by a spring pressed ball 407C mounted in the upper end of said transfer lever and adapted to be positioned on either side of shaft 407D, as shown in Figure 4.

While the transfer levers 407 are in operative position, rotation of the actuator serves to move the numeral wheel of the next higher order one step by means of tens-carrying pins carried by said actuator and moved laterally by camming surfaces provided on arm 407B. Thereafter the transfer levers are restored to inoperative position by suitable cam projections on the actuator. This operation is well understood in the art, and for more complete disclosure, reference is made to the above mentioned Patent No. 1,643,710.

Resetting mechanism

The numeral wheels 401 (Figures 4, 11, and 15) are mounted on a rotatable sleeve 409 in which is disposed a stationary shaft 410 which is provided with a longitudinal groove 410A in alignment with the teeth 412, one of which is disposed in an enlarged bore of each dail. The groove 410A is normally in radial alignment with a series of holes in the sleeve 409, in each of which is disposed a ball 411 so that rotational movement of the sleeve 409 will force said ball out of the groove 410A and beyond the periphery of said sleeve in which position they will contact the teeth 412 of the numeral wheel dial. The projection of the balls 411 is so timed that they are past the zero position of the tooth 412 (Figure 4) before such movement occurs. Therefore all the numeral wheels rotated out of such position are carried back to said position by a complete revolution of the sleeve 409.

The means whereby clockwise rotation is imparted to the sleeve 409 to perform the resetting operation and the means for releasing the overthrow preventing pawls will be described hereinafter.

THE GRAND TOTAL REGISTER

The grand total register mounted in the carriage 400 below the subtotal register comprises a series of numeral wheels 420 (Figures 4, 11, and 12). Each is rotatably mounted on the hub 421B of an adjacent member 421, which is keyed to a normally stationary shaft 422. Each of the totalizer wheels 420 is provided on one side with a ten-tooth gear 423 formed on a collar secured to said wheel. The gear 423 meshes with a twenty-tooth gear formed on the outer circumference of ring gear 424. The inner circumference of the ring gear 424 is toothed to mesh with three planetary gears 425 mounted on a supporting gear 426 (Figures 4 and 11). The planetary gears 425 mesh with a sun gear 427 integrally mounted on a collar on which is formed a ten-tooth gear 428 which meshes with twenty-tooth gear 402.

From the foregoing it will be seen that the subtotal register and the grand total register are connected in corresponding orders by a differential gear assembly. The ratio of the gears is such that the corresponding numeral wheels of the two registers are connected in a 1–1 gear ratio. This may readily be seen as the gear 403, a ten-tooth gear, meshes with twenty-tooth gear 402, which meshes with a ten-tooth gear 428, with which the sun gear 427 is integrally formed. The sun gear 427 drives the planetary gear 425 at a ratio of 2–1. The planetary gears 425 have a 1–4 ratio with the ring gear 424, which is in a 2–1 ratio with the gear 423. Also meshing with gear 423 is a gear 487 which is adapted to be rocked into mesh with gear 402 during total transferring operations as will be described hereinafter.

Means are provided for locking the totalizer wheels 420 against movement, said means being adapted to be disabled during certain operations. Overthrow preventing pawls 430 (Figure 4) are urged into engagement with gears 423 by springs 430A and are provided with keys disposed in the keyway of shaft 436C said keys being only half the width of the keyway in shaft 436C. Shaft 436C is maintained in its furthest clockwise position to maintain said pawls in locking engagement with gears 423 by a pawl 431 (Figure 1) secured to a sleeve 431A within which said shaft 436C telescopes and to which it is keyed. The nose of said pawl engages a notch in the periphery of a disk 432 secured on sleeve 474 (Figure 15) under the influence of a strong compression spring 431B held between the nose of said pawl and the tail of a pawl 433 loosely mounted on sleeve 431A. The nose of pawl 433 is held in engagement with the periphery of a disk 434 by a spring 433A.

When disk 434 is rotated by means to be described hereinafter so that the nose of pawl 433 registers with the notch in disk 434, spring 433A becomes effective to rock pawl 433 and pawl 431 through its lateral extension 431C thereby rocking sleeve 431A and shaft 436C in a counter-clockwise direction so that the right edge of the keyway in shaft 436C engages the keys on pawls 430 (Figure 1). Thus the pawls are conditioned to operate as conventional spring pressed overthrow preventing pawls thereby permitting rotation of totalizer wheels 420. It is to be noted that the above described movement of pawl 431 is not sufficient to entirely withdraw the nose of said pawl from the notch in disk 432, but it is moved to a position corresponding to the position of pawl 413 with respect to disk 414 as shown in Figure 1.

Means are provided for disabling the locking means for the totalizer wheels 420 under control of a manipulable member to permit values to be manually set on said wheels. Key 440 (Figure 1) suitably mounted in the frame of the machine, is normally held in raised position by a spring 440A and a cam surface 440B on said key is adapted on depression thereof to move a slide 441 to the left by contacting a pin 441A on said slide. Said slide is provided with a pin 441B near the left end thereof which contacts and rocks a lever 442 integral with disk 434 against the tension of spring 442A. Such counter-clockwise movement of lever 442 and disk 434 aligns the notch in said disk with the nose of pawl 433 permitting movement of said pawl to release the overthrow preventing pawls 430 as previously explained. The knurled disks 420B (Figure 11) integral with totalizer wheels 420 may be used to set values into said wheels. It is to be noted that due to the engagement of pin 435 with the flat end of transfer lever 436 (Figure 13) the dial is positively prevented from being moved negatively past its zero position, and such setting movement must be in a counter-clockwise direction when changing the dial setting to a higher number. Furthermore the dial should never be moved through its 9–0 position when manually setting to a lower number, since this would set the lever 436 in that order into a position to effect a transfer during a subsequent operation. The spring 437B is of such strength as to require a distinct effort on the part of the operator to move the dial through its 9–0 position, thus insuring that the operator will not inadvertently rotate the dial forward past 9, and requiring him to rotate the dial in a clockwise direction when setting to a lower number.

Means are provided for locking the subtotal wheels during manual setting of the totalizer wheels. A pin 440C on the release key 440 overlies the upper arm of a bellcrank lever 417 (Figure 1) secured to disk 416 so that upon depression of key 440 disk 416 moves pawl 415, thereby seating the nose of pawl 413 in the notch in disk 414, rotating sleeve 413A and shaft 405 to lock pawls 404 in engagement with subtotal wheels 401.

*Tens carrying mechanism*

In order to correctly accumulate a plurality of transferred values into the grand total register, said register is provided with separate tens carrying means. The tens carrying members for the successive numeral wheels are spaced a sufficient angular distance apart about the shaft on which they are mounted so that they are brought into operation successively during the rotation of said shaft. It has been found that the angular spacing necessary for more than nine numeral wheels is more than 360 degrees. Therefore, since it is usually desirable to provide a grand total register having at least twelve numeral wheels, means are provided for giving the shaft 422 two complete tens carrying revolutions from its neutral position, such means being described hereinafter.

The tens carrying mechanism for the grand total register, as shown in the accompanying drawings, comprises a projection 435 (Figures 11 and 13) provided on the side of each numeral wheel opposite its gear 423 and adjacent the numeral wheel of the next higher order. At zero position, as shown in Figure 13, this projection 435 is disposed against the flat end of a camming tooth of a member 436, which is pivotally mounted on its supporting shaft 436C and normally held in its upper position by a spring pressed ball 437 (Figures 4 and 13) mounted in a shaft 437A in a position to contact an arm 436A of the lever 436. While transferring values thereto, the numeral wheel 420 of the grand total register and the integral projection 435 are rotated in an additive or counter-clockwise direction, as will be hereinafter described. Therefore, when a numeral wheel has moved nine steps from zero in said additive direction, its projection 435 will be disposed immediately to the left of the camming tooth of the lever 436, and another additive step will rock the lever 436 to its lower position, where it is also held by the spring pressed ball 437 until restored by instrumentalities to be hereinafter described.

When the lever 436 has been rocked to its lower position, a lateral projection 436B of said lever will be in the path of a pin 438 protruding from both sides of a lever 438A pivoted on the member 421 at 438B, and normally held with pin 438 in its outward radial position by a spring 438C. It will be noted that the portion of the pin 438 (see also Figure 11) that projects into the plane of the gear 423 of the numeral wheel of higher order, normally clears the gear teeth and the projection 436B of the lever 436, but when the projection 436B has been rocked to lie in the path of the pin 438, clockwise rotation of the pin 438 during a tens carrying operation will result in its being forced radially inward to pass under the projection 436B, and in so doing it contacts one tooth of the gear 423 of the numeral wheel of next higher order, and displaces it one pitch distance, thereby rotating the numeral wheel one step to effect a tens carrying operation. The counter-clockwise rotation of the pin 438 is effected through the member 421 to which it is pivoted, said member being keyed to the shaft 422, which as explained hereinbefore, makes two complete revolutions to effect tens carrying operation of all of the numeral wheels in the grand total register.

Means are provided whereby the lever 436 is restored to its rearward ineffective position immediately following a tens carrying operation. Wedge-shaped camming projections 421A of the member 421 are so arranged that they will contact any effective projection 436B of the levers 436 during rotation in either direction and restore them to their ineffective positions, and since the respective camming projection 421A immediately follows the pins 438 during the counter-clockwise tens carrying revolution, this restoration takes place immediately after the occurrence of a tens carrying operation.

Zero resetting mechanism

The clearance or zero resetting operation of the grand total register is accomplished through a plurality of revolutions of the shaft 422 in a clockwise direction, said shaft serving to drive the numeral wheels by the friction caused by the tension of a leaf spring 420A (Figure 4), as explained in detail in Patent Number 2,044,978, issued to Avery and Lerch on June 23, 1936. Any numeral wheel upon which a value is registered is stopped at zero position by the engagement of the pin 435 carried thereby with the flat end of the camming tooth of carry lever 436 (Figure 13). The angle of engagement of said pin and said tooth is such that there is no tendency to rock the lever 436 about its pivot, but said lever serves as a positive stop for the numeral wheel upon clockwise rotation thereof.

As all resistance to free rotation of the numeral wheels 420 is removed during a resetting operation, one revolution of the shaft 422 is sufficient to return said numeral wheels to zero position. However, an additional safety factor is added by rotating said shaft a plurality of times as disclosed herein.

DRIVE AND DRIVE CONTROL

Subtotal register

The drive for the subtotal register clearing mechanism and total transfer mechanism is transmitted from the shaft 100 by suitable intermediate gearing (Figure 20) to shaft 446, upon which the clutch 454 is mounted. The specific mechanism employed in clutch 454 is identical in all particulars with that disclosed in the main clutch of the above mentioned patent to Friden, No. 1,643,710, and so will not be described specifically herein. The clutch 454 is controlled by a bellcrank 453 and a key 450 (Figure 1).

The subtotal or accumulator clear key 450 (Figures 1, 16, and 20) pivoted at 451 is normally held in its elevated position by a spring 450A and upon depression thereof serves, through a pin 453A, to impart a clockwise oscillation to the clutch bellcrank 453 mounted on a shaft 453C which is suitably journaled in the side frame of the machine and which closes a contact to start the motor. This clockwise oscillation of the bellcrank 453 permits engagement of clutch 454, which if the key 450 were immediately released, would normally permit said clutch to rotate one revolution before it was again disengaged by the clutch bellcrank 453. However, in the present construction, the bellcrank 453 is held out to permit engagement of the clutch for three revolutions, even though the key 450 has been immediately released.

Rotatably mounted on a stud 457 (Figure 2) adjacent the clutch housing is a gear 456 so arranged that it is advanced one tooth for each revolution of the clutch housing by contact of a pin 454A fixed on a side of said clutch housing, and in the path of which one tooth of said gear is held by a spring pressed pawl 458. Secured to the side of the gear 456 is a multiple cam 455 having one depression in its periphery for each three teeth in the gear. A projection 453B of the clutch bellcrank 453 is normally disposed in one of the depressions of the cam, and, upon a rocking of the bellcrank to permit engagement of the clutch, the cam is moved to position its extreme outer periphery under the projection 453B, where it is held until the middle of the third revolution of the clutch, or until three teeth of the gear have been tripped, at which time it drops into the next depression of the cam. Consequently, this results in the disengagement of the clutch and locking of the clutch housing in full cycle position at the end of this revolution.

The three revolutions of the clutch housing of clutch 454 are transmitted by its integral gear 454B (Figures 1 and 20) through a large idler 459 directly to the gear 460 (Figures 1, 15, and 20) which is keyed to a sleeve 461. The sleeve 461 is in turn keyed to a telescoping shaft 462, which is secured at the left end thereof (Figure 15) to the sleeve 409 previously described as being adapted to reset the subtotal register to zero upon rotation thereof.

From the foregoing it is seen that upon depression of the key 450 (Figure 1) a drive is transmitted to the resetting sleeve 409 (Figure 15) to reset the subtotal register to zero, three rotations being imparted thereto. The two additional rotations have no utility in connection with the actual resetting operation, but are utilized in total transfer operations as will be described hereinafter.

Means are provided for releasing the overthrow preventing pawls 404 for the subtotal register wheels during a resetting operation. Secured to the sleeve 461 (Figures 1 and 15) is a notched disk 414 with which cooperates a pawl 413 (Figure 1) secured to a sleeve 413A which is keyed to the shaft 405 in the same manner as sleeve 461 and shaft 462, thereby providing an extensible connection between said sleeve and said shaft. Upon rotation of the resetting shaft, the disk 414 forces the nose of pawl 413 out of the notch in said disk and rocks pawl 413, sleeve 413A, and shaft 405 in a counter-clockwise direction, rocking the pawls 404 keyed to said shaft 405 out of engagement with the subtotal register wheel gears 403 (Figure 4).

Grand total register

The grand total clear key 470 (Figures 1, 16, and 20) controls engagement of a clutch 465 on shaft 446 (Figure 20) which is similar in all respects to the clutch 454 previously described herein, so that engagement of said clutch is continuous for three revolutions, said revolutions being transmitted through intermediate gears 466 and 467 to gear 468 (Figures 15 and 20) keyed to a sleeve 471 (Figures 15 and 15A). Clear key 470 is maintained in depressed position during the three revolutions as the end thereof is forked to receive a pin on the clutch release bellcrank. Fast on sleeve 471 is a ratchet wheel 472 (Figures 15 and 15A) with which a pair of pawls 472A can engage. These pawls are pivotally secured to a clutch housing 473 and being adapted to drive said housing upon clockwise rotation of said ratchet wheel as transmitted from the clutch 465. The housing 473 is secured to a sleeve 474 which is keyed to an extension of shaft 422 (Figure 15), thereby providing a telescoping connection between said shaft 422 and the drive therefor, so that the resetting mechanism is operable in any displaced position of the carriage.

Means are provided to unlock the totalizer wheels upon depression of the grand total register clear key. An extension 470A (Figures 1 and 16) on said key overlies a pin 442A on lever 542 so that upon depression of said key lever 442 and disk 434 are rocked in a counter-clockwise direction, thereby aligning the notch in said disk with the nose of pawl 433. Spring 433A then becomes effective to rock pawl 433, sleeve 431A and shaft 436C in a counter-clockwise direction to unlock pawls 430 in the manner above described, which, however, remain in engagement with the gear 423 until released by said resetting means upon rotation thereof.

Means are provided for moving the overthrow-preventing pawls to disengaged position upon initial movement of the resetting means. Secured to the sleeve 474 (Figure 15) is the notched disk 432 which controls the release of the overthrow preventing pawls in resetting operations, as in the case of resetting the subtotal register wheels. As shown in Figure 1, rotation of disk 432 rocks pawl 431 secured to shaft 436C in a counter-clockwise direction, rocks sleeve 431A and the telescoping shaft 436C to release the pawls 430 (Figure 4).

Depression of the grand total clear key also serves to lock the subtotal registering wheels in their position so that no movement thereof will ensue due to the differential gearing connecting the grand total and subtotal register wheels. An upward extension 470B of key 470 abuts a pin 417A on bellcrank lever 417 (Figure 1) so that depression of said key serves to rock said bellcrank and disc 416 integral therewith to lock pawls 404 in the manner heretofore described.

Figure 19:
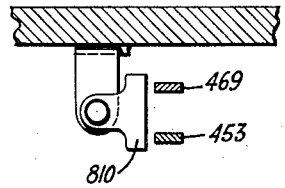
Figure 19 is a detail view taken on line 19—19 in Figure 1 showing the interlocking means between the grand total and subtotal or accumulator clear keys.

Interlocking means are provided to prevent simultaneous operation of the resetting clutches, said means comprising the T-shaped member 810 (Figures 1 and 19) which is pivoted in the machine immediately forward of downward extensions on the clutch release bellcranks 453 and 469. The arrangement is such that upon movement of one of said bellcranks to clutch engaging position, the other is held in clutch disengaging position.

TOTAL TRANSFER

The total transfer key 480 (Figures 1 and 20) is adapted upon depression thereof to rock the clutch release bellcrank 453 to engage the subtotal clear clutch 454 to institute a resetting operation of the subtotal registering wheels 401. The rearward extension of said key engages the end of pin 453A which extends to the left of bellcrank 453. As previously described, this results in three revolutions of said clear clutch 454 and the resetting sleeve 409 (Figures 4 and 15).

Means are provided for unlocking the grand totalizer wheels upon depression of the total transfer key. A pin 480A (Figures 1 and 16), secured to said key, overlies the lower arm of lever 442, so that, upon depression of said key, lever 442 and disk 434 are rotated to permit the seating of pawl 433 in the notch in said disk to accomplish the unlocking of the grand totalizer wheels by means heretofore described.

Means are provided for engaging intermediate gears upon depression of the total transfer key to establish a direct driving train between the respective subtotal and grand total register wheels. A collar 481 formed on the total transfer key is pinned to sleeve 451 (Figure 3) within which is keyed a telescoping shaft 482 which extends to the left into the carriage frame. A rack 483 is provided at the left end of said shaft to mesh with a rack formed on the lower arm of a bellcrank lever 484 loosely mounted on shaft 422. The upper arm of said bellcrank supports a shaft 486 which extends transversely of the carriage and which is supported at its opposite end by an arm similarly pivoted on shaft 422. Said shaft 486 supports a plurality of idler gears 487 (Figures 3, 4, and 11) which are constantly enmeshed with totalizer gears 423 and are adapted upon depression of key 480 to be rocked into engagement with gears 402 to establish a driving connection between the respective subtotal and grand total register wheels. Gears 487 in each order comprise two gears integral with a connecting collar, one of said gears meshing with gear 423 and the other with gear 402 (Figure 11).

Resilient latching means are provided to maintain the total transfer key in depressed position and said intermediate gears in operative position during the zeroizing of the subtotal wheels in a total transferring operation. A spring arm 488 (Figures 1 and 16) is secured to the collar of the key 480 by any suitable means and a depending arm thereof is offset to cooperate with a lug 489 struck out from the intermediate plate. As shown in Figure 1, spring arm 488 is to the left of said lug resiliently latching key 480 in raised position. Upon depression of said key arm 488 is moved over said lug and to the right thereof to latch said key in depressed position and thereby to latch gears 487 in operative position.

Means are provided for restoring said gears to inoperative position at the end of the first revolution of the resetting shaft for the subtotal register wheels. A gear 490 (Figures 5 and 15) is secured to the left end of the resetting sleeve 409 and meshes with a gear 491, the gear ratio being such that gear 491 is rotated once for each three revolutions of gear 490. Secured to the right side of gear 491 for rotation therewith are a mutilated gear 492 and a cam 495 (Figures 5, 15, and 20), said cam being adapted to cooperate with the shaft 486 (Figures 3 and 4) at the left end thereof. The arrangement is such that upon depression of key 480, shaft 486 is rocked to the right to move gears 487 to operative position, the cut out portion of cams 495 being positioned opposite shaft 486. At the end of the first rotation of resetting sleeve 409 and gear 490 the rise of cam 495 becomes effective to rock shaft 486 and gears 487 to inoperative position so that the connection between the registers is broken during tens carrying in the grand total register. Cam 495 also returns key 480 to raised position.

Means are provided for imparting two revolutions to the transfer mechanism for the grand total register following the revolution of the sleeve 409 which is effective to zeroize the subtotal register wheel and transfer the value standing therein to the grand total register wheels 422. Mutilated gear 492 is provided with teeth over two-thirds of its periphery, and adapted to mesh therewith is the gear 493 meshing with a gear 494 secured to the shaft 422. The gear 493 is normally registering with the mutilated portion of gear 492 so that rotation thereof due to zeroizing of the grand total register does not impart any movement to the gear 492. This mutilated portion extends over one-third of the periphery, so that no movement is transmitted to shaft 422 during the first rotation of sleeve 409, but during the last two revolutions of said sleeve gear 492 becomes effective to drive gear 493, gear 494, and the shaft 422 to operate the tens carrying mechanism for the grand total register. During this counter-clockwise rotation of shaft 422, it rotates within the stationary clutch housing 473 and pawls 472A (Figures 15 and 15A) merely rasp over ratchet 472.

Means are provided for maintaining the grand total register wheels in unlocked condition during the entire total transferring operation. Total transfer key 480 through pin 480A rocks lever 442 upon depression of said key to permit pawl 433 to be seated in disk 434 to unlock the grand total register wheels, as hereinbefore described. As said key only remains depressed during the first revolution, other means are provided to maintain said registering wheels in unlocked condition during the remainder of the total transferring operation. A cam 496 secured to the left side of gear 491 (Figures 5, 15, and 20) is provided with a notch in which an arm 497 (Figure 5) is seated when said cam is in full cycle or neutral position under the pressure of compression spring 497A positioned between said arm and the rearward arm of a lever 498. The forward arm of lever 498 underlies a pin on an arm 499 secured to the left end of shaft 436C. The arrangement is such that upon rotation of cam 496 during a total transferring operation arm 497 and lever 498 are rocked in a clockwise direction and maintained in said displaced position until the end of the operation. Lever 498 underlying the pin on arm 499, serves to maintain said arm and shaft 436C in the position to which they were moved by depression of total transfer key 480, thereby maintaining pawls 430 conditioned to operate as spring pressed overthrow preventing means.

AUTOMATIC DIVISION

As previously described, the process of division is performed in the instant machine by building a dividend figure in one register to equal the dividend figure set in a second register, by additions or subtractions of the divisor in the various ordinal positions of the carriage. The dividend is set on the grand total register wheels 420 by means heretofore described, wherein the setting is locked during the performance of the problem of division, in which these wheels serve as controllers. The divisor is set on the keyboard, and in so setting the divisor, certain control columns are established to control machine operation in accordance with the figures of the dividend as set in the grand total register and the figures of the partial dividend as registered in the subtotal register.

The mechanism in the control columns is thereby enabled to compare the values standing in the respective aligned numeral wheels of the grand total register and subtotal register to determine the proper machine operation to bring the value in the subtotal register to correspond to the value in the grand total register in that order. Thus, if the grand total register wheel is set at a greater value than the subtotal register, positive actuations are determined, whereas if the grand total register has a value less than the value of the subtotal register, negative actuations are determined. In the event that the respective values of the grand total register and subtotal register wheels are equal in the control columns, a carriage shift is determined to bring another ordinal registration in the grand total register into the control column wherein the process is repeated. The number of actuations in each order necessary to obtain the registration of the dividend in the subtotal register wheels is entered in the revolutions counter 376 (Figure 7), which registers at the end of the operation the desired quotient figure.

*Value comparing control mechanism*

Means are provided for forming a continuous indication of the value registered on the subtotal register wheels. Rigid with the intermediate gear 402 is a gear 601 (Figure 4) which meshes with a gear 602 loose on shaft 603. The gear 602 is of one-half the pitch diameter of the gear 601, and therefore rotates in a 1–1 ratio with the subtotal register wheel 401. Rigid with the gear 602 is an arm 604 which therefore assumes a certain definite angular position for each digital registration of the subtotal register wheel, and rotates in a counter-clockwise direction during positive actuation as shown in Figures 4, 6, and 21, where said arm 604 occupies the position which corresponds to a zero registration on the subtotal register wheel 401.

From the foregoing it is evident that the arm 604 rotating in a counter-clockwise direction passes opposite the shaft 609 as the value on the associated subtotal register wheel changes from 9 to 0.

Means are provided for forming a continuous indication of the relation of the value set in the grand total register wheel and the value registered in the subtotal register wheel. The planetary gears 425 are mounted on a gear 426 which meshes with a gear 607 loose on shaft 603 and integral with said gear 607 is an arm 608. The arm 608 is responsive to movements of both the grand total and subtotal or accumulator register wheels, being moved through the same angular distance as said wheels. The position of said arm when the grand total and subtotal register wheels are at zero is shown in Figures 4 and 21, i. e., along the line of centers of shafts 603 and 609. When a number is set on the grand total wheel 420 by means of knurled disk 420B, such counter-clockwise movement of register wheel 420 causes counter-clockwise movement of gear 607 and arm 608. Positive actuation of subtotal register wheel 401 is accompanied by clockwise rotation of arm 608 as shown in Figure 21, the direction of rotation being reversed during negative actuation.

If the grand total register wheel 420 be held stationary while the subtotal register wheel 401 is rotating, the planetary gears 425 and gear 426 will be set around through one-third of the angle that register wheel 401 is rotated through. This is evident from the fact that the centers of the planetary gears move through half the lineal distance of the pitch diameter movement of sun gear 427 at one and one-half times the radius of said gear, which will therefore be one-third the angular movement of the sun gear 427. Similarly the planetary gears and gear 426 are set around one-third the amount that grand total register wheel 420 is rotated if the subtotal register wheel 401 is held stationary as with the sun gear 427 stationary, the planetary gears move through two-thirds the angular rotation of the ring gear 424 whose angular movement is one-half that of register wheel 420.

If, starting from the position which gear 426 occupies when the values of the subtotal register and the grand total register wheels are equal, gear 426 is allowed to rotate and one of said register wheels is rotated, as is the case during actuation, the wheels will again register equality as the gear 426 completes one-third of a revolution, will again register equality as it completes two-thirds of a revolution, and once again will register equality as it completes the entire revolution. These three positions, each one-third of a revolution apart, are the only positions which gear 426 can occupy when the registration on the register wheels 401 and 420 are equal. The gear 607 being one-third the size of gear 426 therefore rotates three times for each rotation of gear 426 and occupies a single definite rotational position when the dials 401 and 420 register equality. The arm 608, therefore, has a position which is representative of equality of the wheels 401 and 420, such position being the one in which it is lined directly toward the axis of shaft 609 (Figures 4 and 21).

If grand total register wheel 420 is held stationary and the subtotal register wheel 401 is rotated, as is the case during the operation by the build-up division process, arms 604 and 608 rotate in opposite directions at equal angular velocity. Said arms 604 and 608 are adapted to alternately engage lugs 611 on sleeve 612 (Figures 4 and 6) and rotate the sleeve first in one direction and then in the other. Arm 604 is adapted to carry the lugs 611 to the right as viewed in Figures 6, 4, and 21 as the registration on the subtotal register wheel 401 passes from 9 to 0. As the registration on subtotal register wheel 401 becomes equal to that of grand total register wheel 420 during positive actuation, arm 608 carries the lugs into an upright position, and as the registration on the register wheel 401 becomes greater than that on the register wheel 420, said arm carries the lugs to the left. Thus, lugs 611 are positioned to the right when the registration on the sub-total register wheel 401 is less than that on the grand total register wheel 420, are positioned vertically when the two registrations are equal, and to the left when the registration on the dial 401 is greater than that on the dial 420.

In Figure 21 the direction of rotation of the various gears connected to the subtotal register wheel 401 and the grand-total register wheel 420 are shown as they obtain during positive registration. During negative registration the direction of rotation of all the various gears and the arms 604 and 608 is reversed. One of two possible conditions obtains when the two arms 604 and 608 pass during their opposite rotation. In one of these conditions the register wheel 420 is set at 0 and the register wheel 401 is changing from 9 to 0. This condition is illustrated in the Figure 6 in which the arm 604 is shown in its zero position and the arm 608 is shown in the position it occupies when the registration on the two register wheels is equal, in this case in the zero registration. The dotted line position intermediate the arms 604 and 608 show the position of said arms at the time of passing, in which position they clear the lugs 611 so that there is no possibility of a jam due to the arms trying to rotate the lugs in opposite directions. The same condition obtains when the register wheel 420 stands at 9 and the registration of the register wheel 401 changes from 0 to 9, in which position the two arms will cross in a position to the left of the center line, similar to the one illustrated to the right thereof.

Rigid with sleeve 612 is a plate 613 having an especially shaped slot 614 through which extends pin 616 on arm 617, said arm being rockably mounted on shaft 618. Slot 614 is so shaped that it holds pin 616 in a certain position when the lugs 611 are displaced to the right and plate 613 to the left while it moves the pin 616 to a lower position when said lugs are displaced to the left and plate 613 to the right, as viewed in Figure 4. When lugs 611 occupy their vertical position the slot 614 is sufficiently wider to permit movement of the pin 616 to either of the two previously mentioned positions and also to a higher position than either of them, to which position it is moved when the register wheels 401 and 420 have the same registration.

Also pivoted on shaft 618 is a lever 619 terminating at its rearward end in a plate 620 (Figures 4 and 10). Said lever 619 is pulled upward against a stop 617A on lever 617 by means of a spring 619A and said lever is keyed to the shaft 618 with a narrow key, the keyway in the shaft being sufficiently wider than the key on said lever to permit rocking of said lever through an angle with respect to the shaft as great as the angle through which lever 617 is rotated by slot 614. It is to be understood that all the mechanism thus far described is repeated in each column position of the carriage excepting only the shaft which runs the length of the carriage, and serves to mount all similar parts. Shaft 618 is continually urged in a clockwise direction as viewed in Figures 4 and 7 by means of a lever 622 on the end of said shaft and a spring 623 cooperating therewith.

It is evident from the foregoing description that levers 617 and 619 tend to rock about shaft 618 as a single unit, unless the plate 620 be forced down against the tension of spring 619A. There are, therefore, three different levels to which the plate 620 may be brought by the slot 614 and the cooperating mechanism. Each spring 619A is of sufficient strength to overcome the opposing torque on shaft 618 which is exerted by spring 623 (Figure 7), therefore the plate 620 is brought to the highest of these three levels if the subtotal register wheel 401 registers more than the grand total register wheel 420 and to the middle level if register wheel 401 registers less than the register wheel 420, and it reaches the lowest of the three levels if the registration of the wheels is equal.

Means are provided for establishing as control orders the left hand order in which the divisor has been set and all orders to the left thereof, the setting of a number in any order serving to disable all orders to the right. As shown in Figure 10, the plates 620 are notched at their left upper edges and at their right lower edges so that each plate overlies the one to the right and upon depression thereof will carry all plates to the right thereof to the same lower position. Mounted on shaft 624 (Figures 4 and 10) is a series of spring pressed levers 626 in the plane of each selection lever 308. The rearward end of each lever 626 is adapted to cooperate with a depression in shoulder 308D formed on said selecting lever 308, when said lever is in its zero position, where said lever 626 is normally maintained by the spring 626A. When a numeral key is depressed in this order, the bell crank 308 rocks in a counter-clockwise direction camming the lever 626 out of the depression in the shoulder 308D to force the forward laterally offset nose 626B thereof downwardly, carrying the plate 620 to the right downwardly, and with it all other orders to the right (see Figure 10). Thus, when a value is set in one order the control mechanism is disabled in all orders to the right thereof by depressing the plates 620 to their equality position, tensioning the springs 619A.

From the foregoing description it appears that the plate 620 may be brought to three different levels; being in the highest of the levels when the digit in register wheel 401 is greater than that in the register wheel 420; to the middle position if the digit is less, and to the lowest of the three positions if the registration on the register wheels is equal. If the registration on the register wheels is equal, the spring pressure of shaft 618 tending to rotate in a clockwise direction, will bring plate 620 to its lowest position unless some other plate be held in a higher position due to an inequality in another column, in which case the rotation of shaft 618 is stopped by the higher plate. In all columns to the right of the furthest left digit on the keyboard, plate 620 is depressed by projection 626B in the manner previously described and these projections serve to bring the plates down into the lowest of the three positions which they may occupy, namely the position corresponding to equality. Plates 620 to the right are therefore definitely fixed throughout the particular setup and carriage position and therefore do not further control the operation of the machine, but the left order of the setup and all orders to the left thereof become control orders. If all control orders reach equality simultaneously shaft 618 will rotate to the furthest clockwise position that it can occupy because in all non-control orders levers 619 have been forced into their equality position. When there are inequalities in a series of control orders the position of shaft 618 is determined by the leftmost lever 619, standing in an inequality position, since due to the interlocking of plates 620 no lever 619 can go higher than those to the left of it, but may assume a lower position without affecting any control over shaft 618, and due to the width of the keyway in said shaft the lever 619 standing at its highest level determines the position of shaft 618.

Means are provided to transfer control to a lower order when the higher order moves to equality, and to accomplish this, the pin 616 in the orders standing at equality is free to float downward in slot 614 to any of two inequality positions so as to allow the levers 617 and 619 in the lower orders to rock counter-clockwise and effect an actuation cycle.

*Machine operation control mechanism*

In the manner previously described the shaft 618 and lever 622 rigid therewith (Figure 7) may occupy three different positions. The furthest clockwise of these positions represents an equality condition occurring simultaneously in all control orders. The lever 622 is shown in this position in Figure 7. Since the first digit of the divisor may not be contained an even number of times in the partial dividend figure to which it is desired to build, this condition of simultaneous equality may occur for only an instant during the progress of a digitation operation. The middle position of lever 622 indicates that in the column furthest to the left in which an inequality exists, the subtotal wheel registration is less than that of the grand total wheel, while the furthest counter-clockwise position this lever may assume indicates that in the column furthest to the left the subtotal wheel registration is more than that of the grand total wheel. The various parts of the division control mechanism are shown in Figure 7 in their inoperative position which they occupy during all operations other than division, the lever 622 and shaft 618 being locked in their furthest clockwise position by latch 631 engaging in a notch 622A in the upper end of said lever. The offset upper end of lever 631 is held in engagement with said notch by suitable spring 631A.

Means are provided for releasing the division control mechanism and enabling the control of the same upon initiation of a division operation. The division lever 636, pivoted at 637 is shown in its inoperative position in Figure 7. On movement of said lever toward the front of the machine, the lower end thereof carrying pin 636A contacts the offset end 638A of a slide 638 which is slotted to receive pins 639 to provide a suitable sliding mounting therefor. Slide 638 and division lever 636 are held in the position shown in Figure 7 by a spring 641 tensioned between said slide and a suitable stud on the machine frame. Slide 638 is provided with a pin 638B lying immediately forward of the lower arm of lever 631, being adapted upon rearward movement of said slide to rock lever 631 to release lever 622 and shaft 618.

Means are provided for positioning mechanism to control the engagement of the clutch upon movement of the division lever to operative position. At its rearward end the division slide 638 is provided with a pawl 642 pivoted thereon, the flat end of which is adapted to engage upon rearward movement of said slide, a pin 643A on an upward extension of bellcrank lever 643, rocking said lever in a clockwise direction until said pawl 642 passes over the pin 643A. The forward arm of said bellcrank 643 is provided with a spring extended tip 644 which is adapted to latch over a lateral extension 622B on the lower end of lever 622, if said lever is rocked to its middle or its furthest counter-clockwise position.

The clockwise movement of bellcrank 643 tensions a spring 646 secured thereto and to a lever 647 integral with a collar on shaft 116. Arm 650 extending rearwardly from said collar, overlies a pin 115A on the clutch release bellcrank 115 so that clockwise movement of lever 647 under the influence of spring 646 overcomes the tension of spring 647B tending to hold lever 647 in inoperative position and serves to engage the actuator clutch. However, it is to be noted that such engagement only occurs if the arm 622 is in its middle or furthest counter-clockwise position and not in the position shown in Figure 7 in which a lateral extension 647A on lever 647 underlies the lateral extension 622B on lever 622.

Means are provided upon movement of the division slide to operative position for conditioning mechanism to control shifting of the carriage. Near its forward end the division slide 638 is provided with a pin 638C which lies immediately forward of the upper arm of a lever 648 pivoted at 649. The lower arm of said lever is connected by a link 651 to a bellcrank 652 to the longer arm of which is attached a spring 653 tensioned between said arm and a lever 654 which is provided with a square shaped opening in the upper end thereof for a purpose to be described hereinafter. The lever 654 is normally maintained in the position shown in Figure 7 by a spring 654A tensioned between said lever and a suitable stud on the side plate. Thus, rearward movement of the division slide through the linkage 648, 651, 652, serves to tension spring 653 which tends to rock levers 654 and shaft 656. To the right hand end of shaft 656 is attached the shift clutch release lever 501 (Figure 1) so that clockwise movement of shaft 656 tends to engage the shift clutch 502 which by means of the cam 503 secured thereto operating on the shifting link 504 displaces the carriage one step to the left in a manner fully disclosed in the Friden Patent No. 1,970,512 issued August 14, 1934.

Means are provided for latching the division slide in rearward position and thereby latching the control mechanism in operating position. Formed on the division slide is a tooth 638D which is adapted to engage behind the nose 657A of latching lever 657, such engagement being maintained by spring 658 tensioned between the forward end of said lever and a suitable stud on the machine frame. Overlying the rearward end of lever 657 is the nose 659 of a lever which is rocked upon movement of the carriage to its extreme left hand position in a manner fully disclosed in the Avery et al. Patent No. 2,014,013 issued September 10, 1935.

Means are provided for shifting the reversing gearing into a position to determine subtractive actuation upon movement of shaft 618 and lever 622 to their furthest counter-clockwise position. Secured to shaft 618 is a lever 661 (Figures 7 and 8) the lower end of which is disposed in front of and spaced from a pin 662 on reverse link 227 (Figure 8), such position being the normal position, or the position such lever 661 occupies when a shift is determined. As shaft 618 is moved to its middle position in which positive actuation is determined, the lever 661 moves up to the pin 662 and upon rotation of shaft 618 to its furthest counter-clockwise position arm 661 contacting pin 662 moves link 227 rearwardly to shift the reversing gearing to subtractive position in the manner described hereinbefore.

Means are provided for restoring control bellcrank 643 to its raised position after a shifting operation. Secured to the shaft 505 (Figures 1 and 7) is a cam 666 which rotates in unison with the shift clutch housing 502. The cam 666 is adapted to engage and reciprocate a slide 667 through a pin 667A on the forward end thereof. Said slide 667 is connected at its rearward end to the lower arm of bellcrank 643 so that movement of said slide to the left as viewed in Figure 7, raises the forward arm of bellcrank 643 in a position to be latched by the extension 622B on lever 622. Such movement of bellcrank 643 serves to tension spring 646 which again urges lever 647 to clutch engaging position. The spring 653 is always tensioned to urge the arm 654 to shift clutch engaging position. The control of lever 622 is exercised by selecting which of the spring urged members 647 and 654 becomes effective to initiate operation of the corresponding clutch. If arm 622 is in its middle position or its furthest counter-clockwise position, bellcrank 643 is latched in raised position by the engagement of spring extended tip 644 with the lateral extension 622B on lever 622. This lateral extension in either of these two positions is out of the path of the upper end of arm 647 so that said arm is free to move upwardly under the influence of spring 646 to rock arm 650 and clutch release bellcrank 115 to engage the main clutch. When arm 647 is in its raised position and the main actuator clutch is engaged, a pin 647C on said arm 647 is positioned at the top of the opening in arm 654 preventing downward movement thereof under the tension of spring 653 so that the shift clutch can not be engaged.

However, if the control exercised determines a shifting operation, arm 622 remains in the position shown in Figure 7, in which position it is not effective to latch bellcrank 643 in raised position and said bellcrank falls again under the influence of spring 646, and pin 647B in its lower position permits downward movement of arm 654 under the influence of spring 653 to rock shaft 656, arm 501, and engage the shift clutch. Said arm 654 is maintained in its lowest position during the shifting operation, thereby serving to prevent movement of arm 647 which is also blocked against movement by contact of the upper end thereof with the lateral extension 622B on lever 622. At the conclusion of the shifting operation cam 666 reciprocates link 667 and raises arm 643 and spring extended tip 644 thereof to a position to be latched by the extension 622B in the event that the next operation determined is an actuation.

To summarize briefly the control exercised by arm 622 in its furthest clockwise position as shown in Figure 7, it prevents operation of arm 647 to engage the main drive clutch and permits movement of arm 654 under the influence of spring 653 to engage the shift clutch. In its middle position, it latches bellcrank 643 in raised position to tension spring 646 which raises arm 647 to engage the main actuator clutch, the pin 647C serving to prevent spring 653 becoming effective to engage the shift clutch. In this position arm 661 (Figure 8) is moved up to pin 662 but the reversing gearing remains set for positive actuation. If arm 622 is in its furthest counter-clockwise position, arm 661 has moved link 227 rearwardly shifting reversing gearing through cam flange 228 and shaft 142 in a position to determine subtractive rotation. Arm 643 is still maintained in its locked position and the tension of spring 646 becomes effective to engage the main clutch for a negative actuation, pin 647C also serving in this position to prevent movement of arm 654 to engage the shifting clutch.

Throughout the progress of a division operation, spring 653 is under tension tending to engage the shift clutch, but spring 646 is sufficiently stiffer than spring 653 so that, when it is placed under tension due to the tip 644 being supported on the extension 622B, it entirely overcomes the tension of spring 653 and rocks arm 647 to engage the main clutch 110, pin 647C on lever 654 being positioned at the top of opening 654B in lever 654 prevents movement thereof to engage the shift clutch.

The clearances provided are such that when pin 647C is against the top of opening 654B one clutch will engage just as the other disengages, and the raising of either clutch release dog as far as the outside periphery of the clutch housing, will effectively disengage the opposite clutch. Thus, if while either clutch is engaged, the condition of spring 646 is changed so that the spring tension tends to disengage that clutch and to engage the other clutch, the clutch release dog on the first clutch will be thrust against its housing, but cannot, of course, rock further until the cycle is completed and the opening in the housing into which it seats has come into place to receive it. Therefore the second clutch cannot engage until the first clutch has completed its cycle, and the seating of the clutch release dog in the first clutch housing permits the final amount of movement necessary to engage the second clutch.

*Operation*

The operation of the automatic division mechanism disclosed herein will be described in connection with the solution of three typical problems. The first problem selected being the division of 4011 by 21. The solution of the promlem is illustrated diagrammaticaly in Figure 25 where the comparing control mechanism is shown in the various positions assumed thereby during the calculation. The four columns represent the four orders in which digits of the dividend are set; each row represents a different stage of the calculation, the values standing in the two registers being shown to the right of each row. In the first row in Figure 25 the controlling mechanism is shown in normal position, both registers standing at zero.

The first step in the operation is the setting of the dividend in the grand total register wheels 420 by depression of key 440 and by means of knurled disks 420B (Figure 4). The digit 4 is entered in the highest order grand total register wheel, the arm 604 remains in the position shown in Figure 4 representing the value 0 on the corresponding sub-total register wheel 401, while arm 608 is moved four units distance in a counter-clockwise direction as indicated at the left of the second row of symbols in Figure 25, thereby positioning lugs 611 in their right hand position and moving pin 616 into the right hand end of slot 614 (Figure 4) positioning arm 617. Arm 619 and shaft 618 remain in their neutral position as latch 631 (Figure 7) is still effective. Controlling arms 604 and 608 in the second order remain in their zero position as no number is set therein. However, in the third and fourth orders the number 1 is entered as indicated in the register wheels 420 to the right of the second row and the respective arms 608 are moved one position in a counter-clockwise direction. This condition is illustrated in the second row in Figure 25.

Figure 25:
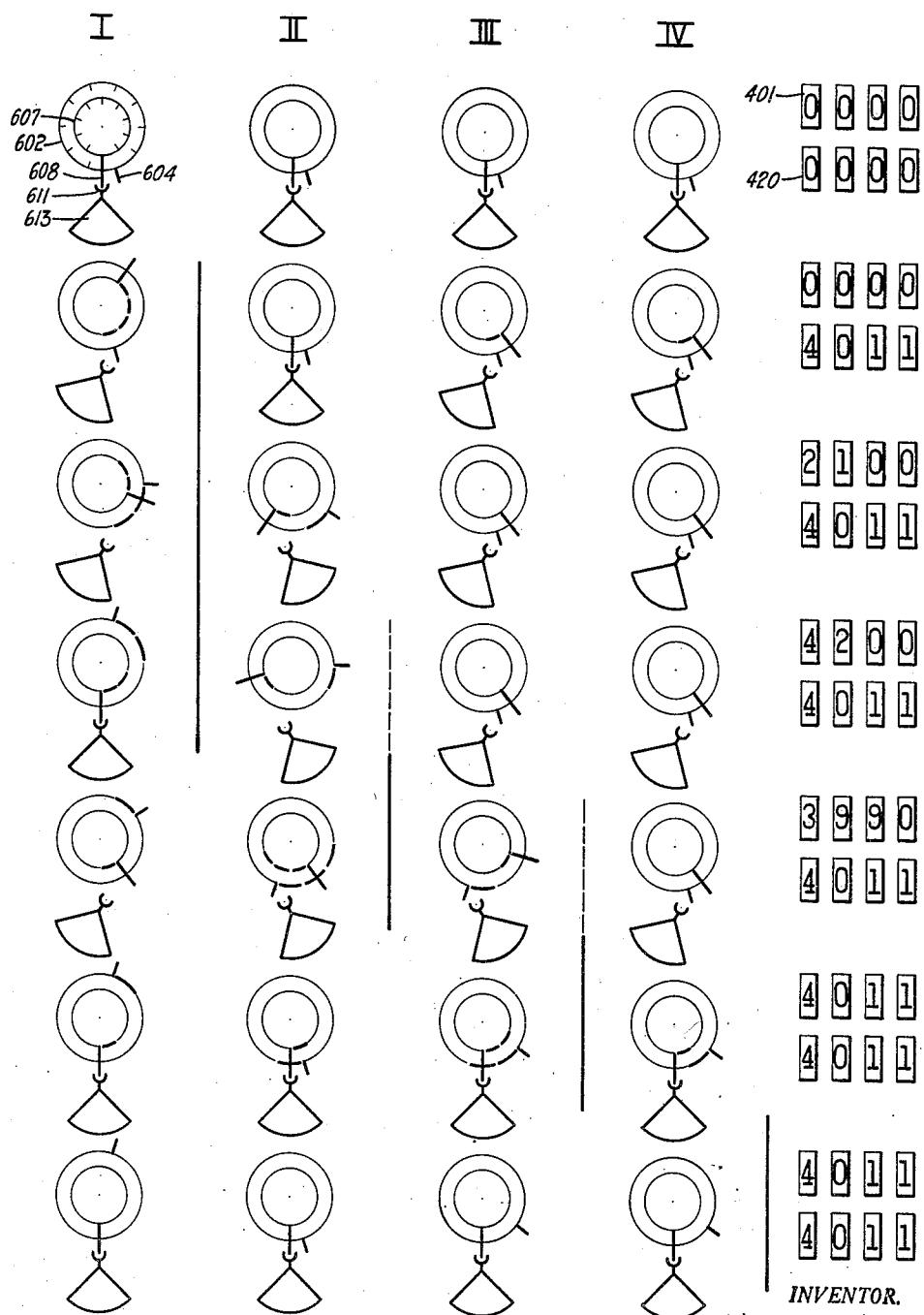
Figure 25 is a diagrammatic view illustrating the successsive positions of the comparing mechanism during the operation of the automatic division mechanism in performing a problem in division.

The divisor 21 is then set up in the keyboard so that the highest order digit of the divisor is aligned with the highest order digit of the dividend set in the grand total register wheels as appears in the register at the right of the third row of symbols in Figure 25. In the present problem, the highest order is the only control order, as all orders to the right of the highest digit set in the keyboard are disabled by lever 626 (Figures 4 and 10), which holds the levers 619 to right thereof in their lowest position. The position of lugs 611 and plates 613 is controlling in the highest order as indicated in Figure 25 by the heavy line drawn between the first and second columns.

Division lever 636 is then moved to operative position to enable the division control mechanism by moving slide 638 (Figure 7) to its rearward position where it is held by latch 657. Such rearward movement of slide 638 performs three functions, i. e., the release of shaft 618 and arm 622 by disabling latch 631, the tensioning of spring 653 through the movement of the linkage 648, 651, and 652 and the tensioning of spring 646 due to the clockwise oscillation of bell-crank 643 by pawl 642. The release of shaft 618 permits movement thereof under the influence of spring 619A (Figure 4) which is sufficiently strong to overcome spring 623 (Figure 7) into the position determined by lugs 611, plate 613 and arm 617 in the highest order, lugs 611 are in their right hand position as shown in row two, (Figure 25), so that shaft 618 and arm 622 are moved to their middle position to determine a positive actuation. Thus spring extended tip 644 is latched over lateral extension 622B and spring 646 becomes effective to rock lever 647 and arm 650 to engage the actuator clutch 110.

The clutch having been engaged and the reversing gears being set to determine positive actuation, one addition of the divisor 21 occurs in the two highest orders of the subtotal register, giving the reading as shown in the third row, and during this digitation, the controlling arms 604 and 608 in the highest order are moved, arm 604 in a counter-clockwise direction for two increments, and arm 608 in a clockwise direction, as indicated in Figure 25. Correspondingly, arms 604 and 608 in the second order have received one increment movement in the second order while no movement is imparted to the arms in orders three and four as indicated in the third row in Figure 25. The position of lugs 611 and 613 remain the same, as indicated in Figure 25, so that another positive actuation is determined, the nose 644 (Figure 7) being retained over lateral extension 622B, the tension on spring 646 serving to maintain the main actuator clutch in engagement so that the number 21 is again added in the two highest order places as indicated in the subtotal register wheel in row four (Figure 25).

During this actuation in the highest order the arm 604 is moved two units in a counter-clockwise direction while arm 608 is moved two units in a clockwise direction to return lugs 611 to their upright position indicating equality in the highest order, and slot 614 allows pin 616 and arm 617 to move to the furthest clockwise position, springs 623 becoming effective to rotate arm 622 into the position shown in Figure 7 in which the latch 644 is released from the lug 622B and the tension is removed from spring 646, thus permitting the spring 653 to become effective to rock arm 654 downwardly and rock shaft 656 to engage the shift clutch 502 (Figure 1). The lateral shift of the register carriage to the left is illustrated in the diagrammatic illustration in Figure 25 by moving the lines representing the division between controlling and non-controlling orders one order to the right, the second position being shown in dotted lines (row four). At the conclusion of the shifting operation, cam 666 (Figure 7), by its action on pin 667A, link 667, raises tip 644 in position to be engaged by lateral extension 622B tensioning spring 646 and, equality being registered in the highest order to the left, the second order setting becomes effective to control. As shown in Figure 25 in the fourth row the lugs 611 in the next to highest order are rocked to their left hand position so that cam slot 614 engages pin 616 in its left hand end, thereby rocking shaft 618 and arm 622 to their furthest counter-clockwise position in which position latch 644 is retained on the lateral extension 622B and arm 661 (Figures 7 and 8) becomes effective to shift the reversing gearing in position to determine subtractive registration, so that a subtractive actuation ensues.

This subtractive actuation gives the reading 399 in the sub-total register wheels as indicated in Figure 25, this representing one subtractive transferred increment in the highest order, three subtractive increments in the second order (two from digitation and one from transfer), and one subtractive increment in the third order. During the subtractive actuation the two highest order subtotal register wheels have passed through their equality position during the digitation portion of the cycle; that is, the highest register wheel remains at four until the transfer and the registration on the second highest order register wheel returns from one to nine so that it passed through zero during digitation. This instantaneous equality is sufficient to permit the tip 644 to drop from the extension 622B relieving the tension on spring 646 and permitting spring 653 to become effective to rock arm 654 and shaft 656, to engage the shift clutch for another shifting operation. The control column then is moved so that the three highest orders become control columns as indicated in the fifth row in Figure 25 by the dotted line position of the control indicating line.

At the conclusion of the shifting operation the cam 666 through link 667 becomes effective to raise the tip 644 until it is again latched over lateral extension 622B, which is rocked to its central position due to the control determined in the highest order inequality, that is in the highest order (Figure 25), lugs 611 having been rocked by arm 608 into their right hand position. This positive actuation occurs in the third and fourth order and gives a reading in the subtotal register wheel of 4011, resulting in a single clockwise increment being given to arms 608 in the first two columns to return them to their equality position; two clockwise increments of movement in the third column to return arm 608 to its equality position, and one clockwise movement in the fourth column so that the controlling arms are all set at equality, arm 622 being rocked into its left hand position as shown in Figure 7 by spring 623 so that tip 644 is released and the tension is removed from spring 646 so that at the end of the actuation, spring 653 becomes effective to engage the shifting clutch. At the conclusion of each shifting operation, bellcrank 643 and tip 644 are rocked in a clockwise direction but are immediately returned under the influence of spring 646 to permit spring 653 to again engage the shift clutch 502. The shifting continues until the carriage is moved into its extreme left hand position where nose 659 becomes effective as explained in said Patent Number 2,014,013, to disengage latch 657 permitting the return of slide 638 to its forward position by spring 641. Thus, at the conclusion of the operation the division control mechanism is restored to inoperative position.

As stated hereinafter, it is necessary under some circumstances to actuate the dials in both positive and negative directions during a single ordinal calculation. This occurs, however, only when the subtotal dial in the rightmost control order passes from 9 to 0 and thereafter passes equality with the corresponding grand total dial, during the particular cycle of operation in which the two registers pass equality.

A second problem, 10÷3, serves to illustrate this special type of operation wherein the transfer does not occur until after the actuation phase of the cycle is completed, and by that time the rightmost dial has passed equality, making the factor in the subtotal register greater than that in the grand total register. In the present problem, "10" is entered into the register 420, and "3" is successively added into the register 401 until said second register equals the register 420 or passes equality therewith. After three cycles the register 401 stands at "9" and since "9" is less than "10" another cycle is effected, during which the register 401 reads 09, 00, 01, 02, with the transfer making it finally "12". At no time during the last cycle did the register 401 stand at "10" so no shift will result; instead a subtraction cycle will next occur, since register 401 is greater than register 420. During this subtractive cycle the values in register 401 will be 12, 11, 10, 19, and 09, and then, since equality will have occurred, the carriage will shift. If, however, the problem were, for example, 9÷4, the dials, during the last cycle, register 08, 09, 00, 01, 02, and 12, and no subtractive stroke is effected because the two registers passed equality before the dial in the highest control order passed from 9 to 0.

I claim:

1. In a calculating machine having a plurality of groups of ordinal differential elements adapted to represent factors in a plural order calculation, a plurality of orders of means for continuously forming a representation of the relative magnitude of the value of related digits of said factors, actuating mechanism for one of said groups of differential elements and means controlled by said representation forming means for interrupting actuation of said group of differential elements by said actuating mechanism.

2. In a calculating machine having groups of ordinal differential elements adapted to represent factors in a division operation, automatic division control mechanism including an element settable to different positions in accordance with equalities and inequalities of digits represented in ordinally related elements of said groups, and means controlled by said differential elements for continuously maintaining said element in one of such set positions.

3. In a calculating machine having a plurality of groups of ordinal differential elements adapted to represent factors in a plural order calculation, means for comparing the magnitude of the values entered into two of said groups, actuating mechanism for one of said groups of differential elements, means controlled thereby for interrupting actuation of said group of differential elements by said actuating mechanism, and means controlled by entry of a factor into one of said plurality of groups for disabling said controlling means in certain orders.

4. In a calculating machine having a plurality of groups of differential elements adapted to represent factors in a plural order calculation, actuating mechanism for one of said groups of differential elements, means effective during actuation of said elements by said actuating mechanism for comparing the magnitude of the values entered into said groups, normally disabled means controlled thereby for interrupting actuation of said groups of differential elements by said actuating mechanism, and manually operable means for enabling said last named means and initiating operation of said actuating mechanism.

5. In a calculating machine having a plurality of independently settable groups of differential elements adapted to represent factors in a division operation, means for automatically computing a quotient figure and registering the same in one of said groups comprising means for comparing the magnitude of the values entered into a second and a third of said groups and means controlled by said comparing means for entering a value set in a fourth group into one of said last named groups.

6. In a calculating machine having a plurality of relatively displaceable groups of differential elements adapted to represent factors in a plural order calculation, two of said groups being fixed with respect to each other, actuating means for one of said two groups, means for comparing the magnitude of the values entered into said two relatively fixed groups, and means controlled thereby for controlling entry of the factor entered in a third group into said one of said two groups by said actuating means.

7. In a calculating machine having a plurality of relatively displaceable groups of ordinal differential elements adapted to represent factors in a plural order calculation, two of said groups being fixed with respect to each other, actuating means for one of said two groups, means for comparing the magnitude of the values entered into said two relatively fixed groups and forming a continuous indication of the relative magnitude of related digital values, and means controlled by the highest order of the comparing means in which an inequality is determined for controlling entry of the factor entered on a third group into said one of said two groups by said actuating means.

8. In a calculating machine having a plurality of relatively displaceable groups of ordinal differential elements adapted to represent factors in a plural order calculation, two of said groups being fixed with respect to each other, actuating means for one of said two groups, a plurality of orders of means for comparing the magnitude of the values entered into said two relatively fixed groups and forming a continuous registration of the relative magnitude of related digital values, means controlled by the highest order of the comparing means in which an inequality is determined for controlling entry of the factor entered on a third group into said one of said two groups by said actuating means, and means controlled by said third group upon entry of a factor therein for disabling the control of said last named means in all orders to the right of the highest order of said entered factor.

9. In a calculating machine having a first group of ordinal differential elements and a second group of ordinal differential elements, actuating mechanism for said second group and means for displacing said second group relative to said actuating mechanism, means for comparing the magnitude of a digit set in one order in said first group of differential elements with the magnitude of a digit set in the corresponding order in said second group, and means controlled by said comparing means for operating said actuating mechanism to change the factor in the compared order in said second group and for displacing said second group relative to said actuating mechanism upon an equality found by said comparing means in a compared order.

10. In a calculating machine having a first group of differential elements and a second group of differential elements, actuating mechanism for said second group and means for displacing said second group relative to said actuating mechanism, means for comparing the magnitude of a digit set in one order in said first group with the magnitude of a digit set in the corresponding order in said second group, and means controlled by said comparing means in response to a finding thereby of equality of the compared factors for actuating said means for displacing said second group relative to said actuating mechanism.

11. In a calculating machine having a plurality of independently settable groups of differential elements adapted to represent factors in division operation, means for automatically computing a quotient figure and registering the same in one of said groups, said registering means including a second and a third of said groups, means for comparing the magnitude of digits entered in a plurality of orders in said second and third groups, means controlled by said comparing means for selectively changing the value in said second group by a value set in a fourth group, and for changing the order which said fourth group value changes in said second group.

12. In a calculating machine having a first group of ordinal differential elements and a second group of ordinal differential elements to represent factors in a plural order calculation, means for comparing the magnitude of digits in order of the factor entered in said first group with the magnitude of digits in corresponding orders of the factor entered in said second group, means controlled by said comparing means for equalizing the factors in said groups, and means rendered effective by said comparing means when said factors have become equal for arresting operation of said equalizing means.

13. In a calculating machine, a first group of differential elements individually movable to register a multidigit factor, a second group of differential elements individually movable to register a multidigit factor, and means movable by said elements during their registering movement to form a mechanical representation of the relative magnitude of said factors.

14. In a calculating machine, a rotatable register wheel, a differentially settable control device associated therewith, and means for comparing the magnitude of amounts registered upon said wheel and upon said device respectively, comprising means movable in one direction along a given path by registering movement of said wheel and in the opposite direction along said path by registering movement of said device.

15. In a calculating machine, a rotatable register wheel, actuating means therefor, a differentially settable control device associated with said register wheel, means for comparing the magnitude of amounts registered upon said wheel and upon said device respectively, comprising means movable in one direction along a given path by registering movement of said wheel and in the opposite direction along said path by registering movement of said device, and means controlled by said comparing means for controlling operation of said actuating means.

16. In a calculating machine, a series of rotatable register wheels, actuating means therefor, means for effecting relative displacement of said register wheels and said actuating means, a series of differentially settable control devices associated with said register wheels, means for comparing the magnitude of amounts registered upon said wheels and said devices respectively, comprising means movable in one direction along a given path by registering movement of said wheels and in the opposite direction along said path by registering movement of said devices, and means controlled by said comparing means for selecting said actuating means or said displacement effecting means for operation.

17. In a calculating machine having a register comprising a series of registering wheels arranged in denominational orders, and actuating mechanism for entering digital values into said wheels; the combination of a series of control devices, arranged in denominational orders corresponding to the orders in which said registering wheels are arranged, and each differentially settable to register digital values, a series of members arranged in denominational orders corresponding to the orders in which said wheels and control devices are arranged, and each settable to positions representative of the relative magnitude of the digital values registered on the wheel and control devices of the same order, and means for setting each of said members comprising a connection between each member and the registering wheel of the same order, effective during entry of a digital value into said wheel by said actuating mechanism to differentially adjust the member, and a connection between each member and the control device of the same order, effective during setting of the control device to differentially adjust the member.

18. In a calculating machine having a series of ordinally arranged registering elements, and actuating mechanism for entering digital values into said series of elements; the combination of a series of ordinally arranged control devices differentially settable to register digital values, a series of ordinally arranged members each settable to positions representative of the relative magnitude of the digital values registered on ordinally corresponding elements and control devices, respectively, of the aforesaid series, and means for setting said members comprising means movable by an ordinally corresponding registering element during actuation of said element by said actuating mechanism for effecting differential adjustment of each of said members, and means controlled by each of said control devices for effecting differential adjustment of an ordinally corresponding one of said members.

19. In a calculating machine having a series of ordinally arranged registering elements, and actuating mechanism for entering digital values into said series of elements; the combination of a series of ordinally arranged control devices differentially settable to register digital values, a series of ordinally arranged pivotally mounted members each adapted to be moved to positions representative of the relative magnitude of the digital values registered on ordinally corresponding elements and control devices, respectively, of the aforesaid series, and means for moving said members comprising means movable by each registering element during actuation of said element by said actuating mechanism for effecting differential adjustment of an ordinally corresponding one of said members in one direction, and means controlled by each of said control devices for effecting differential adjustment of an ordinally corresponding one of said members in the opposite direction.

20. In a calculating machine having a register comprising a series of registering wheels arranged in denominational orders, actuating mechanism for entering digital values into said wheels, and means for setting said actuating mechanism to enter selected digital values into said wheels; the combination of a series of control devices, arranged in denominational orders corresponding to the orders in which said registering wheels are arranged, and each differentially settable to register digital values, a series of members, arranged in denominational orders corresponding to the orders in which said wheels and control devices are arranged, and each settable to positions representative of the relative magnitude of the digital values registered on the wheel and control device of the same order, means for setting each of said members comprising a connection between each member and the registering wheel of the same order, effective during entry of a digital value into said wheel by said actuating mechanism to differentially adjust the member, a connection between each member and the control device of the same order, effective during setting of the control device to differentially adjust the member, and means controlled by said series of members for interrupting the entry of digital values into said wheels by said actuating mechanism.

21. In a calculating machine having a register comprising a series of registering wheels arranged in denominational orders, actuating mechanism for entering digital values into said wheels, and means for setting said actuating mechanism to enter selected digital values into said wheels; the combination of a series of control devices, arranged in denominational orders corresponding to the orders in which said registering wheels are arranged, and each differentially settable to register digital values, a series of members, arranged in denominational orders corresponding to the orders in which said wheels and control devices are arranged, and each settable to positions representative of the relative magnitude of the digital values registered on the wheel and control device of the same order, means for setting each of said members comprising a connection between each member and the registering wheel of the same order, effective during entry of a digital value into said wheel by said actuating mechanism to differentially adjust the member, a connection between each member and the control device of the same order, effective during setting of the control device to differentially adjust the member, means controlled by said series of members for interrupting the entry of digital values into said wheels by said actuating mechanism, and means controlled by the means for setting said actuating mechanism, for rendering selected members of said series ineffective to control said interrupting means.

22. In a calculating machine having a register comprising a series of registering wheels arranged in denominational orders, actuating mechanism arranged in corresponding denominational orders for entering digital values into said wheels, and means arranged in corresponding denominational orders for setting said actuating mechanism to enter selected digital values into said wheels; the combination of a series of control devices, arranged in denominational orders corresponding to the orders in which said registering wheels are arranged, and each differentially settable to register digital values, a series of members, arranged in denominational orders corresponding to the orders in which said wheels and control devices are arranged, and each settable to positions representative of the relative magnitude of the digital values registered on the wheel and control device of the same order, means for setting each of said members comprising a connection between each member and the registering wheel of the same order, effective during entry of a digital value into said wheel by said actuating mechanism to differentially adjust the member, a connection between each member and the control device of the same order, effective during setting of the control device to differentially adjust the member, means controlled by said series of members for interrupting the entry of digital values into said wheels by said actuating mechanism, and means controlled by the actuating mechanism seting means of the highest denominational order in which a value other than zero is set, for rendering ineffective to control said interrupting means, all of said members in denominational orders below the one in which such a value is set.

23. In a calculating machine having a register comprising a series of registering wheels arranged in denominational orders, actuating mechanism for entering digital values into said wheels, and means for setting said actuating mechanism to enter selected digital values into said wheels; the combination of a series of control devices, arranged in denominational orders corresponding to the orders in which said registering wheels are arranged, and each differentially settable to register digital values, a series of members, arranged in denominational orders corresponding to the orders in which said wheels and control devices are arranged, and each settable to positions representative of the relative magnitude of the digital values registered on the wheel and control device of the same order, means for setting each of said members comprising a connection between each member and the registering wheel of the same order, operable during entry of a digital value into said wheel by actuating mechanism to differentially adjust the member, a connection between each member and the control device of the same order, effective during setting of the control device to differentially adjust the member, and means controlled by said series of members for interrupting the entry of digital values into said wheels by said actuating mechanism.

24. In a calculating machine having a register comprising a series of registering wheels arranged in denominational orders, actuating mechanism for entering digital values into said wheels, and means for setting said actuating mechanism to enter selected digital values into said wheels; the combination of a series of control devices, arranged in denominational orders corresponding to the orders in which said registering wheels are arranged, and each differentially settable to register digital values, a series of members, arranged in denominational orders corresponding to the orders in which said wheels and control devices are arranged, and each settable to positions representative of the relative magnitude of the digital values registered on the wheel and control device of the same order, means for setting each of said members comprising a connection between each member and the registering wheel of the same order, operable to differentially adjust the member, a connection between each member and the control device of the same order, effective during setting of the control device to differentially adjust the member, means controlled by said series of members for interrupting the entry of digital values into said wheels by said actuating mechanism, and means controlled by the means for setting said actuating mechanism, for rendering selected members of said series ineffective to control said interrupting means.

25. In a calculating machine having a register comprising a series of registering wheels arranged in denominational orders, actuating mechanism arranged in corresponding denominational orders for entering digital values into said wheels, and means arranged in corresponding denominational orders for setting said actuating mechanism to enter selected digital values into said wheels; the combination with a series of control devices arranged in denominational orders corresponding to the orders in which said registering wheels are arranged, and each differentially settable to register digital values, a series of members, arranged in denominational orders corresponding to the orders in which said wheels and control devices are arranged, and each settable to positions representative of the relative magnitude of the digital values registered on the wheel and control device of the same order, means for setting each of said members comprising a connection between each member and the registering wheel of the same order, operable to differentially adjust the member, mechanism between each member and the control device of the same order, for differentially adjusting the member, means controlled by said series of members for interrupting the entry of digital values into said wheels by said actuating mechanism, of means controlled by the actuating mechanism setting means of the highest denominational order in which a value other than zero is set, for rendering ineffective to control said interrupting means, all of said members in denominational orders below the one in which such a value is set.

HAROLD T. AVERY.

CERTIFICATE OF CORRECTION.

Patent No. 2,211,225. August 13, 1940.

HAROLD T. AVERY.

It is hereby certified that error appears in the printed specification of the above numbered patent requiring correction as follows: Page 2, second column, line 74, for the word "is" read --in--; page 4, second column, line 10, for "dail" read --dial--; page 7, first column, line 4, for the reference numeral "542" read --442--; page 12, first column, line 4-5, for "promlem" read --problem--; page 14, second column, line 11, claim 12, for "order" read --orders--; page 15, first column, line 2, claim 17, for the word "devices" read --device--; and second column, line 71, claim 22, for "seting" read --setting--; page 16, first column, line 23-24, claim 23, before "actuating" insert --said--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.